United States Patent
Thomson

(10) Patent No.: US 11,692,358 B2
(45) Date of Patent: Jul. 4, 2023

(54) TILE SYSTEM

(71) Applicant: ULTRAFRAME (UK) LIMITED, Clitheroe (GB)

(72) Inventor: Andrew Thomson, Clitheroe (GB)

(73) Assignee: ULTRAFRAME (UK) LIMITED

( * ) Notice: Subject to any disclaimer, the term of this patent is extended or adjusted under 35 U.S.C. 154(b) by 0 days.

(21) Appl. No.: 17/059,871

(22) PCT Filed: May 31, 2019

(86) PCT No.: PCT/GB2019/051509
§ 371 (c)(1),
(2) Date: Nov. 30, 2020

(87) PCT Pub. No.: WO2019/229468
PCT Pub. Date: Dec. 5, 2019

(65) Prior Publication Data
US 2021/0262241 A1    Aug. 26, 2021

(30) Foreign Application Priority Data

May 31, 2018  (GB) ..................................... 1808952

(51) Int. Cl.
*E04F 13/08* (2006.01)
*H02S 20/25* (2014.01)
(Continued)

(52) U.S. Cl.
CPC ............ *E04F 13/0894* (2013.01); *E04D 1/12* (2013.01); *E04D 1/34* (2013.01); *E04F 13/083* (2013.01);
(Continued)

(58) Field of Classification Search
CPC .......... E04D 1/12; E04D 1/34; E04D 1/2918; E04D 1/2914; E04D 1/2916;
(Continued)

(56) References Cited

U.S. PATENT DOCUMENTS 1,023,878 A * 4/1912 Ronnau ..................... E04D 1/34
52/277
1,182,415 A * 5/1916 Overbury et al. .. E04F 13/0864
52/537
(Continued)

FOREIGN PATENT DOCUMENTS

| CA | 2017548 | 11/1991 |
|---|---|---|
| DE | 1815290 | 6/1970 |
| DE | 10250498 | 7/2003 |

OTHER PUBLICATIONS

International Search Report for Application No. PCT/GB2019/051509, dated Oct. 21, 2019, 3 pages.
(Continued)

*Primary Examiner* — Brian E Glessner
*Assistant Examiner* — Adam G Barlow
(74) *Attorney, Agent, or Firm* — Barnes & Thornburg LLP

(57) ABSTRACT

A tile system comprises at least two tiles and at least one elongate support. Each tile is generally rectangular in shape and has a first edge, and a second edge, the second edge being generally opposite the first edge. Each elongate support has an attachment portion and a support portion. Proximate the first edge each tile is provided with a groove, the groove being configured to receive the support portion of one of the elongate supports and a portion of an adjacent tile proximate its second edge.

19 Claims, 22 Drawing Sheets

(51) Int. Cl.
*E04D 1/12* (2006.01)
*E04D 1/34* (2006.01)
*E04F 13/12* (2006.01)
*E04F 13/18* (2006.01)

(52) U.S. Cl.
CPC .......... *E04F 13/0864* (2013.01); *E04F 13/12* (2013.01); *E04F 13/18* (2013.01); *H02S 20/25* (2014.12); *E04D 2001/345* (2013.01); *E04D 2001/3414* (2013.01); *E04D 2001/3438* (2013.01); *E04D 2001/3447* (2013.01); *E04D 2001/3455* (2013.01); *E04D 2001/3473* (2013.01); *E04D 2001/3494* (2013.01)

(58) Field of Classification Search
CPC ....... E04D 1/2956; E04D 1/29; E04D 1/2907; H02S 20/25; E04F 13/0894; E04F 13/083; E04F 13/0864; E04F 13/12
USPC ............................ 52/518, 519, 536, 539, 541
See application file for complete search history.

(56) References Cited

U.S. PATENT DOCUMENTS

| | | | | |
|---|---|---|---|---|
| 4,958,471 A * | 9/1990 | Waddington | .......... | E04D 12/004 52/550 |
| 5,077,952 A | 1/1992 | Moore | | |
| 5,305,570 A * | 4/1994 | Rodriguez | ............ | E04D 1/2916 52/520 |
| 6,505,451 B1 | 1/2003 | Ksajikian | | |
| 6,670,019 B2 * | 12/2003 | Andersson | .............. | E04F 15/02 52/390 |
| 6,862,857 B2 * | 3/2005 | Tychsen | .................. | E04F 15/02 52/592.1 |
| 7,003,922 B2 * | 2/2006 | Fifield | ...................... | E04D 1/16 52/302.1 |
| 7,748,191 B2 * | 7/2010 | Podirsky | ................... | E04D 3/40 52/541 |
| 8,061,104 B2 * | 11/2011 | Pervan | .............. | E04F 15/02038 52/592.1 |
| 8,695,303 B2 * | 4/2014 | Swanson | ................... | E04B 1/64 52/541 |
| 9,097,021 B1 * | 8/2015 | Williams | ................ | E04D 1/365 |
| 2003/0101681 A1 * | 6/2003 | Tychsen | ................ | E04F 15/04 52/578 |
| 2003/0182888 A1 | 10/2003 | Desbois et al. | | |
| 2004/0187434 A1 * | 9/2004 | Podirsky | ................ | E04D 12/004 52/519 |
| 2006/0096217 A1 * | 5/2006 | Lance | ...................... | E04D 3/02 52/478 |
| 2009/0007516 A1 * | 1/2009 | Swanson | ............ | E04F 13/0864 52/524 |
| 2009/0007517 A1 * | 1/2009 | Swanson | ............ | E04F 13/0805 52/543 |
| 2013/0239495 A1 | 9/2013 | Pao et al. | | |
| 2014/0041321 A1 | 2/2014 | Poivet | | |
| 2014/0215945 A1 * | 8/2014 | Swanson | ............ | E04F 13/0894 52/302.1 |
| 2015/0152641 A1 * | 6/2015 | Torres | ...................... | E04D 1/34 428/319.3 |
| 2017/0234019 A1 * | 8/2017 | Culpepper | ............ | B32B 27/286 52/539 |
| 2017/0298635 A1 | 10/2017 | Brochu | | |
| 2018/0171640 A1 * | 6/2018 | Heidtmann | ................ | E04D 1/29 |
| 2022/0048283 A1 * | 2/2022 | Vignal | ............... | B32B 37/1009 |

OTHER PUBLICATIONS

UK Search Report for Application No. GB1808952.4, dated Nov. 27, 2018, 2 pages.

\* cited by examiner

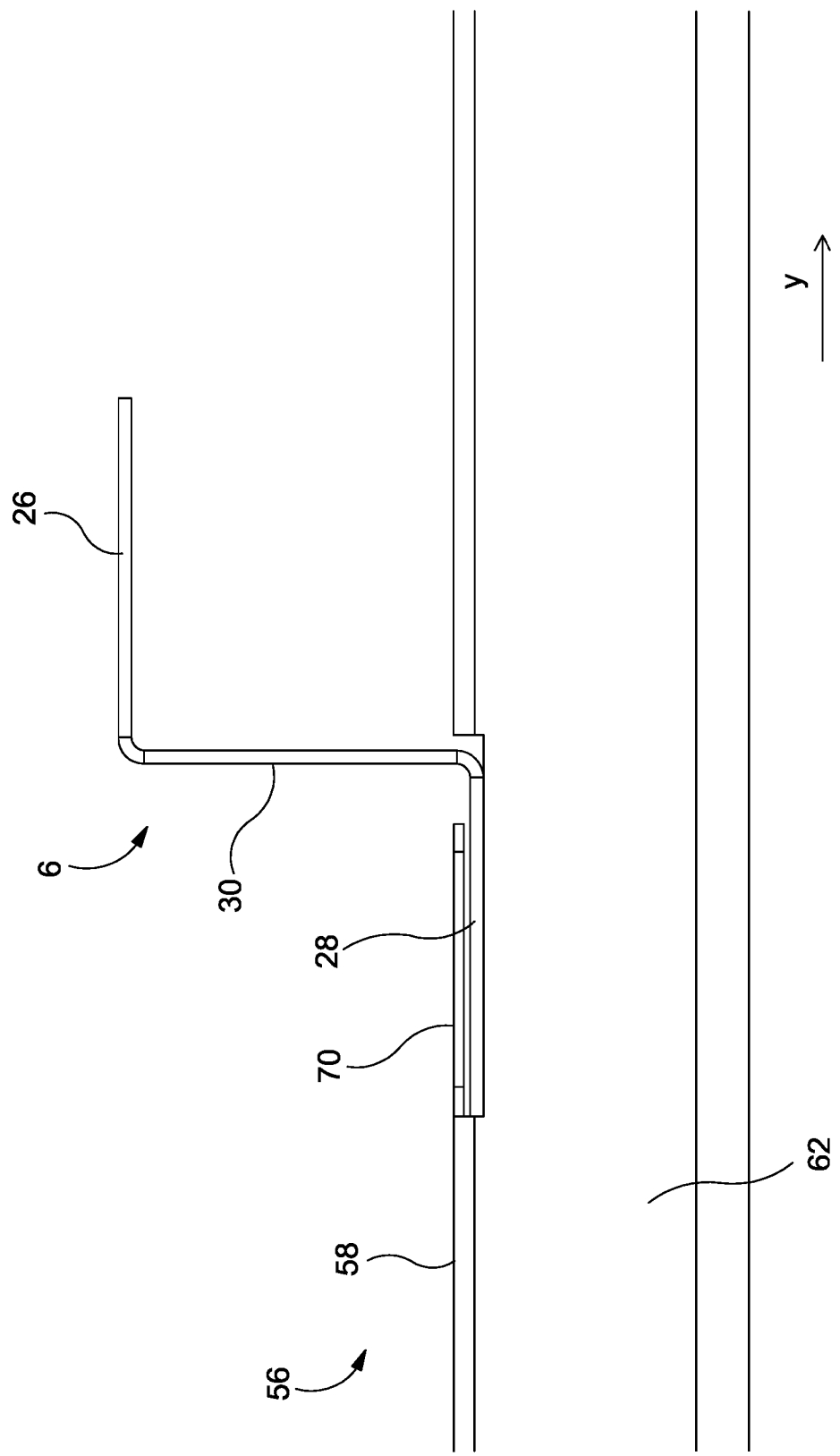

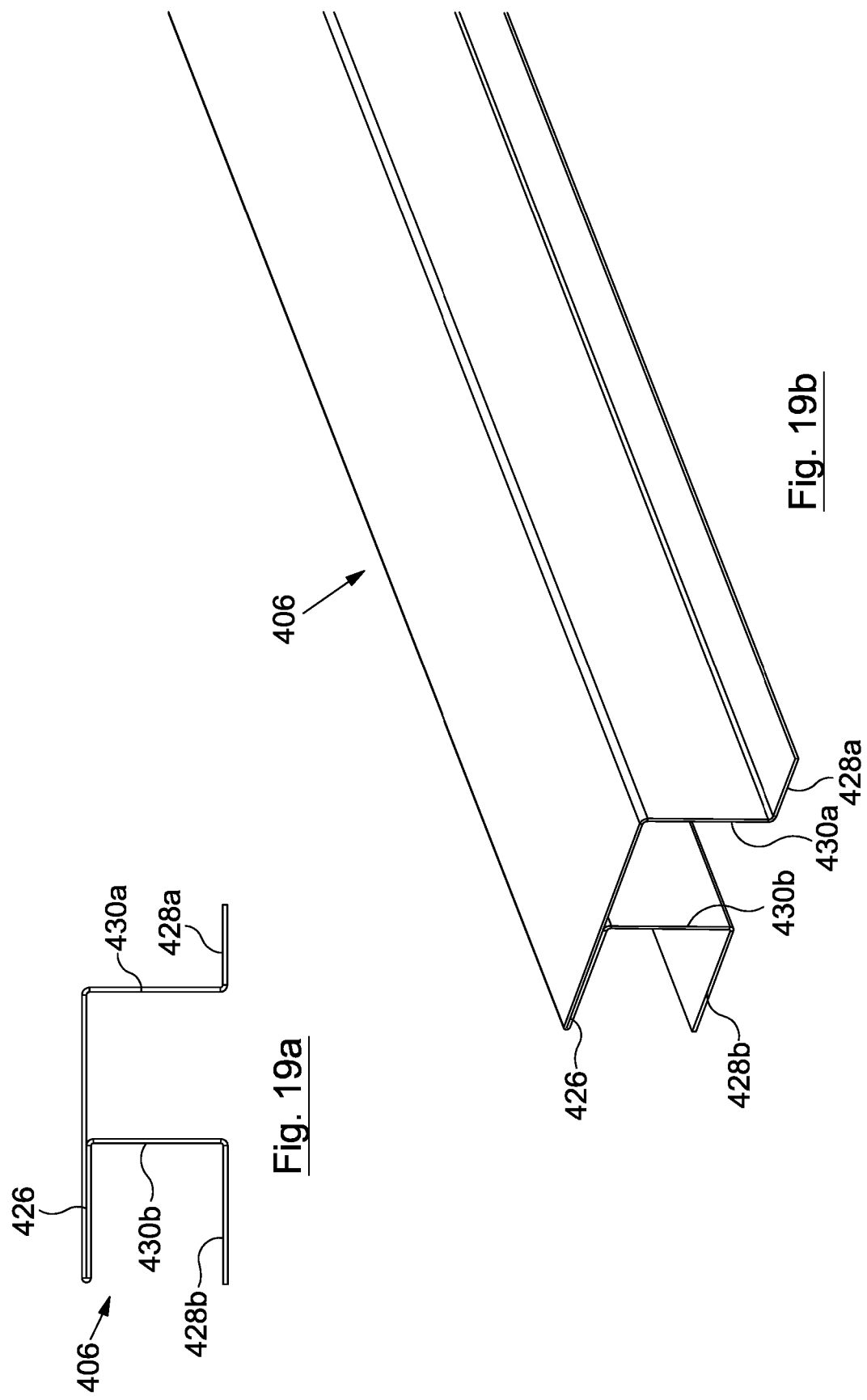

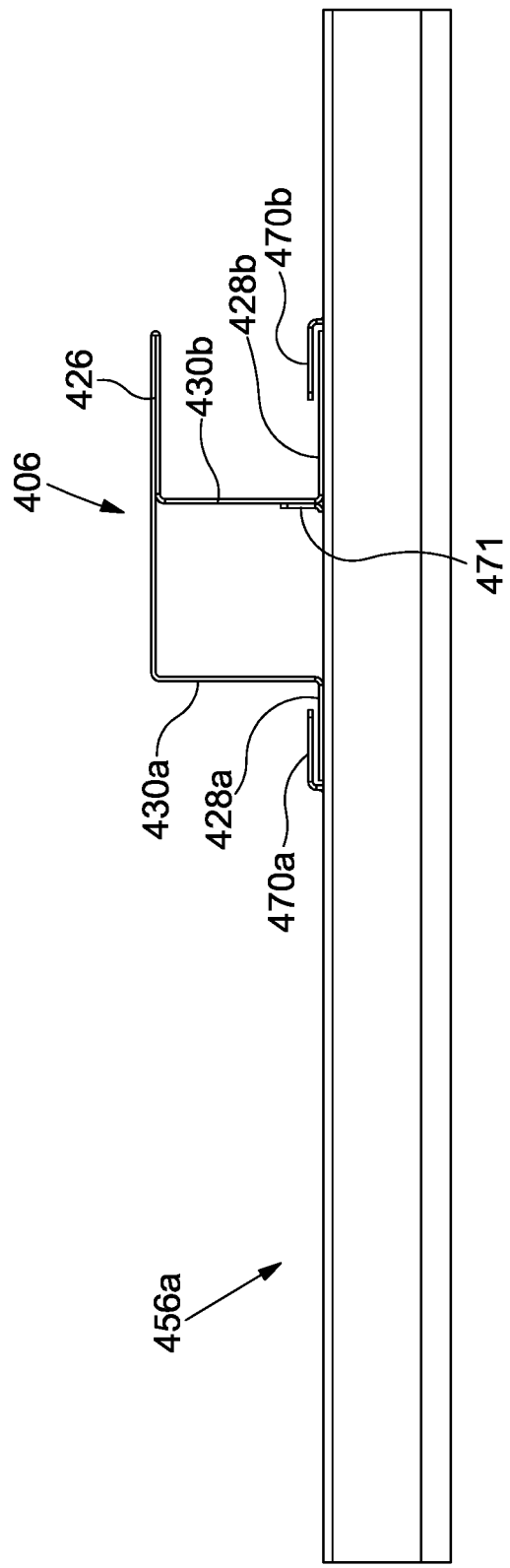

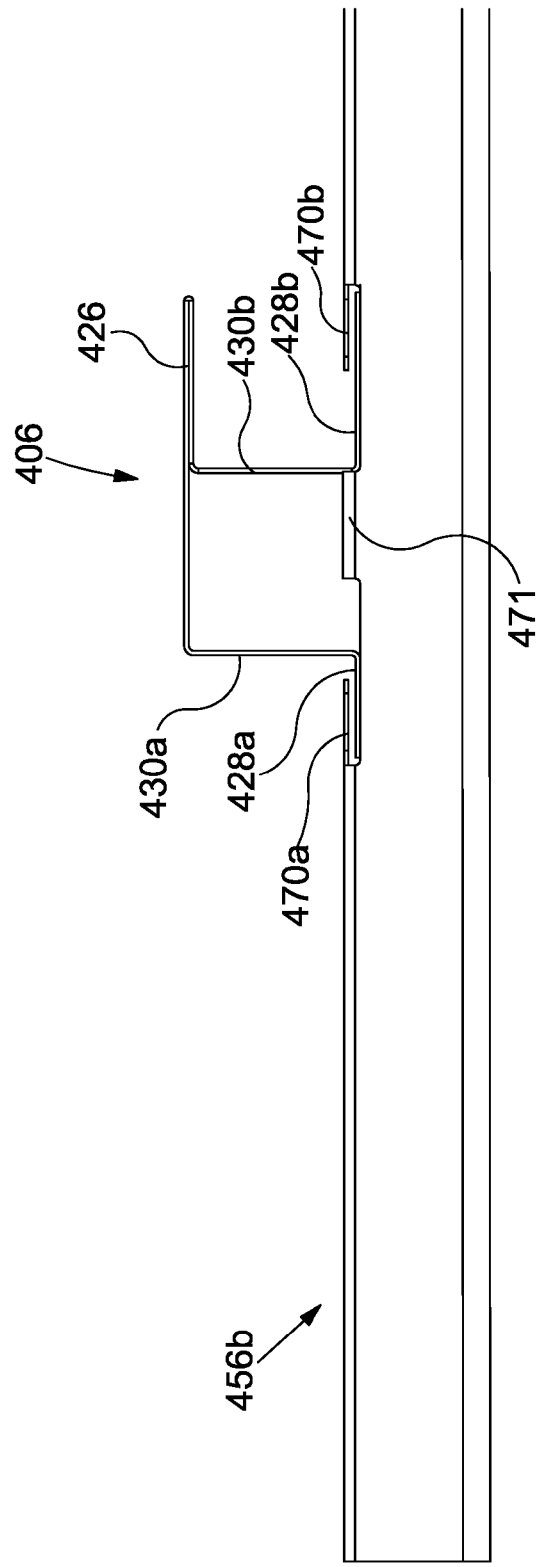

TILE SYSTEM

This application claims priority to and the benefit of International (PCT) Patent Application Number PCT/GB2019/051509, filed 31 May 2019, and published as WO2019/229468 which claims priority to GB patent application number 1808952.4, filed 31 May 2018, and published as GB2574246, the disclosures of which are now expressly incorporated herein by reference.

The present invention relates to a tile system. The tile system may be used to cover a structure such as, for example, a roof structure or a wall (and for such embodiments the tiles may be referred to as cladding).

Typically roof tiles (and cladding) are individually fixed to timber battens. A plurality of parallel spaced apart timber battens are mechanically fixed (for example using nails or screws) to a roof structure (which may be formed from timber rafters). The battens extend generally horizontally across the roof structure. A row of tiles is fixed to each timber batten using mechanical fixings (for example using nails or screws). Typically the tiles are generally rectangular in shape and typically two fixings are used, fixing through the tile proximate to two corners of the tile (which in use are the upper corners of the tile). First a first row of tiles is fixed to a lowest batten. Next a second row of tiles is fixed to an adjacent timber batten such that the second row of tiles partially overlaps the first row of tiles. In this way a plurality of rows of tiles is used to cover the roof structure. With such a prior art system, each tile is mechanically fixed to the roof structure (via two mechanical fixings to a timber batten). Typical cladding systems may be installed in a similar way.

In another prior art arrangement, the tiles may be fastened to battens via retention clips. Such clips may, for example, be arranged connect two overlapping tiles to a batten.

It is desirable to provide a tile system that at least partially addresses one or more of the problems of the prior art, whether identified herein or elsewhere.

According to a first aspect of the present invention there is provided a tile system comprising: at least two tiles, each tile being generally rectangular in shape and having a first edge, and a second edge, the second edge being generally opposite the first edge; and at least one elongate support, each elongate support having an attachment portion and a support portion; wherein proximate the first edge each tile is provided with a groove, the groove being configured to receive the support portion of one of the elongate supports and a portion of an adjacent tile proximate its second edge.

The first aspect of the invention is advantageous because it provides an arrangement that uses significantly fewer fixings than prior art arrangements, as now discussed.

It will be appreciated that the tile system can be used to cover a structure. The structure may be a roof structure, for example a pitched roof. Alternatively, the structure may be a wall (and for such embodiments the tiles may be referred to as cladding).

Typically roof tiles (and cladding) are individually fixed to timber battens. A plurality of parallel spaced apart timber battens are mechanically fixed (for example using nails or screws) to a roof structure (which may be formed from timber rafters). The battens extend generally horizontally across the roof structure. A row of tiles is fixed to each timber batten using mechanical fixings (for example using nails or screws). Typically the tiles are generally rectangular in shape and typically two fixings are used, fixing through the tile proximate to two corners of the tile (which in use are the upper corners of the tile). First a first row of tiles is fixed to a lowest batten. Next a second row of tiles is fixed to an adjacent timber batten such that the second row of tiles partially overlaps the first row of tiles. In this way a plurality of rows of tiles is used to cover the roof structure. With such a prior art system, each tile is mechanically fixed to the roof structure (via two mechanical fixings to a timber batten). Typical cladding systems may be installed in a similar way.

In another prior art arrangement, the tiles may be fastened to battens via retention clips. Such clips may, for example, be arranged connect two overlapping tiles to a batten.

In contrast, with the tile system according to the first aspect of the present invention provides a system which uses significantly fewer fixings. The elongate supports are provided in place of the timber battens, a plurality of parallel spaced apart elongate supports can be attached to a roof structure (or a wall) such that they extend generally horizontally across the roof structure. In use, the first edge of each tile forms a lower edge of the tile and the second edge of each tile forms an upper edge of the tile. A first row of tiles is installed such that the portion of each tile in the first row of tiles which is proximate to the second edge is adjacent to the support portion of a first elongate support. Next a second row of tiles is installed by moving the first edge of each of the second row of tiles towards both: the support portion of the first elongate support; and the portions of the first row of tiles proximate their second edges such that these are both received in the groove.

In this way, the portion of each tile in the first row which is adjacent to the second edge is constrained (by the groove) to be adjacent to the elongate support but without any mechanical fixing thereto. In addition, the tiles in the second row of tiles are supported by the support portion of the elongate support, which is received in the groove.

It will be appreciated that the tile system can be extended to use any number of rows of tiles so as to cover a roof structure or wall.

It will be appreciated that the first row of tiles may be supported by a first support that is attached to the roof structure proximate a lower edge thereof. Such a first support may be generally of the form of the at least one elongate support. Alternatively, the first support may differ from the at least one elongate support. In general, the first support may have an attachment portion and a support portion. The first support may be attached to the roof structure via the attachment portion. The support portion may be received in the groove formed on the first edge of the tiles in the first row of tiles.

It will be further appreciated that a last row, or upper row, of tiles in the tile system may be mechanically fixed (for example using screws or nails) to the roof structure.

The system according to the first aspect of the invention therefore uses significantly fewer fixings than a traditional tile system, with potentially only the last or upper row of tiles being mechanically fixed to the roof structure. This increases the ease of installation of the tile system and the rate at which an installer can install the tile system on the structure.

The system according to the first aspect of the invention is particularly advantageous for systems wherein the tiles are formed from a material that is susceptible to significant thermal expansion and contraction and material softening in use. For example, tiles formed from polymers are particularly susceptible to significant thermal expansion in use. This can be problematic if the tiles are rigidly fixed to support battens, as in prior art systems, since it can lead to buckling of the tile system and can cause the roof system to fail, such that it is no longer weatherproof of the unless care is taken to accommodate the thermal expansion and contraction. To counter any permanent distortion that may occur as a result of expansion, restraint and material softening polymer materials should be allowed to freely move whilst being secured against wind damage. To address this, current solutions require fixings to be applied in a way to allow this movement and therefore are subject to variation in quality and therefore performance. For such prior art systems, wherein each tile is mechanically fixed to a batten this typically increases the skill level that is required for an installer to correctly install the roof system. In contrast, the tile system according to the first aspect of the invention will allow free movement of the individual tiles without requiring any special measures or skill.

It will be appreciated that the groove may be open in a direction that faces away from the tile, generally in a plane of the tile. The at least two tiles are generally mutually parallel and generally parallel to the support portion of each of the elongate supports.

The groove on each tile may be formed across substantially the entire first edge.

Alternatively, the groove on each tile may be formed by one or more discrete features that are spaced apart across the first edge. The one or more discrete features may be referred to as clips.

Each tile may comprise a generally planar body portion and the groove may be formed from at least one protrusion having a first portion which extends generally away from a surface of the generally planar portion and a second portion which extends generally parallel to the planar portion towards the first edge of the tile.

It will be appreciated that the groove is formed between the generally planar body portion and the second portion of the protrusion. The protrusion may be considered to be a clip.

Each tile may be provided with one or more engagement features on the groove and/or the portion of the tile proximate its second edge, said engagement features being arranged to limit relative transverse movement of two adjacent tiles when the support portion of one of the elongate supports and a portion of a second one of the two adjacent tiles proximate its second edge are received within the groove of a first one of the two adjacent tiles.

It will be appreciated that as used herein, unless stated otherwise, transverse movement within the tile system is intended to mean movement in a direction which is generally parallel to the first and second edges of the at least two tiles and generally parallel to the at least one elongate support.

Each tile may have a third edge, and a fourth edge, the fourth edge being generally opposite the third edge. The third and fourth edges may be provided with complementary shapes such that two adjacent tiles can cooperate so as to partially overlap.

For example, adjacent tiles within a single row of tiles may partially overlap so as to provide a weatherproof covering.

A body portion of each tile may be provided adjacent to the third edge with a first recessed portion on a first surface of the body portion and the body portion of each tile may be provided adjacent to the fourth edge with a second recessed portion on a second surface of the body portion, the second surface being opposite to the first surface.

Alternatively, a body portion of each tile may be provided with a tongue portion adjacent to the third edge and with a rebated portion adjacent to the fourth edge.

Each tile may be provided with one or more engagement features proximate the third edge and/or the fourth edge of the tile, said engagement features being arranged to limit relative transverse movement of two adjacent tiles.

It will be appreciated that as used herein transverse movement within the tile system is intended to mean movement in a direction which is generally perpendicular to the third and fourth edges of the at least two tiles.

Each tile may be formed from a plastics material. For example, the tiles may be formed using an injection moulding process. The plastics material may be a thermoplastic material, many of which have relatively high thermal expansion coefficients. Suitable materials include, for example, unplasticized polyvinyl chloride (uPVC), acrylonitrile styrene acrylate (ASA) and polypropelene (PP).

Alternatively, each tile may be formed from sheet metal. The sheet metal may comprise steel. For example, the sheet metal may be formed by a light gauge steel strip. The sheet metal may, for example, be folded or rolled to form a groove on a first edge of the tiles.

Alternatively, each tile may be formed from clay, concrete or the like.

The attachment portion of the elongate support may comprise an attachment surface for contacting a support system.

The support portion and the attachment portion of the or each elongate support may be generally parallel, spaced-apart and connected via a connection portion.

That is, in cross section the elongate support may be generally Z shaped. The connection portion may be generally perpendicular to the support and connection portions.

This shape allows two adjacent elongate supports to partially overlap such that the two elongate supports can move or slide relative to each other (along the direction of the two overlapping elongate supports) prior to fixing to a roof structure or wall. This is advantageous since it means that the elongate supports do not need to be cut precisely to length before installation. This is in contrast to prior art arrangements where timber battens need to be cut precisely to length before installation. It may be advantageous to have one or more standard lengths of elongate support which can be used for multiple situations.

The tile system may further comprise a first support for supporting a first row of tiles.

It will be appreciated that the first support is attached to the roof structure proximate a lower edge thereof. Such a first support may be generally of the form of the at least one elongate support. Alternatively, the first support may differ from the at least one elongate support. In general, the first support may have an attachment portion and a support portion. The first support may be attached to the roof structure via the attachment portion. The support portion may be received in the groove formed on the first edge of the tiles in the first row of tiles.

The first support may comprise a drip edge. The first support may comprise one or more apertures along its length. Said apertures may be provided in a connection portion that extends between a support portion and an attachment portion. The apertures can allow ventilation to a void between the top of a roof structure and the tiles of the tile system.

The or each elongate support may be formed from sheet material. For example, the elongate supports are formed from sheet metal such as, for example, steel.

The support portion of at least one of the or each elongate support may comprise a first conductor, a second conductor and an insulating material disposed between the first and second conductors.

It is known to provide one or more solar tiles in roof systems. Each such solar tile requires an electrical connection to be made and such electrical connections require additional expense and time to install. Providing at least one elongate support having a first conductor, a second conductor and an insulating material disposed between the first and second conductors, the elongate support could form a busbar to provide electrical connection between a plurality of solar tiles.

According to a second aspect of the invention there is provided a tile for use in the tile system of any preceding claim.

According to a third aspect of the invention there is provided a tile comprising: a body portion, the body portion being generally rectangular in shape and having a first edge and a second edge, the second edge being generally opposite the first edge; and a groove proximate the first edge of the body portion, the groove being open in a direction that faces away from the body portion and which is generally in a plane of the body portion; wherein an internal dimension of the groove greater than an external dimension of a portion of the tile proximate the second edge.

The provision of the groove proximate the first edge of the body portion, the groove being open in a direction that faces away from the body portion and which is generally in a plane of the body portion allows the two such tiles to mutually engage by moving the first edge of a tile towards the second edge of the first tile such that the second edge of the first tile is received in the groove in the second tile. This movement may be referred to as longitudinal movement. This is contrary to prior art arrangements for mutually engaging tiles wherein the engagement is typically made using transverse relative movement of the two tiles.

Since the internal dimension of the groove greater than an external dimension of a portion of the tile proximate the second edge, the groove can simultaneously receive a support portion of a support. For example, the groove may be configured to receive both: a portion of another substantially similar tile proximate the second edge of said other tile; and a support portion of one an elongate support.

The tile according to the third aspect of the invention is suitable for use in the tile system of the first aspect of the invention.

In use, the first edge of each tile forms a lower edge of the tile and the second edge of each tile forms an upper edge of the tile. A first row of tiles is installed such that the portion of each tile in the first row of tiles which is proximate to the second edge is adjacent to the support portion of a first elongate support. Next a second row of tiles is installed by moving the first edge of each of the second row of tiles towards both: the support portion of the first elongate support; and the portions of the first row of tiles proximate their second edges such that these are both received in the groove.

The groove may be formed across substantially the entire first edge.

Alternatively, the groove may be formed by one or more discrete features that are spaced apart across the first edge.

The one or more discrete features may be referred to as clips.

The body portion may comprise a generally planar portion and the groove may be formed from at least one protrusion having a first portion which extends generally away from a surface of the planar portion and a second portion which extends generally parallel to the planar portion towards the first edge of the tile.

It will be appreciated that the groove is formed between the generally planar portion and the second portion of the protrusion. The protrusion may be considered to be a clip.

The tile may further comprise one or more engagement features on the groove and/or the portion of the tile proximate its second edge, said engagement features being arranged to limit relative transverse movement of two adjacent tiles when a portion of a second one of the two adjacent tiles proximate its second edge is received within the groove of a first one of the two adjacent tiles.

It will be appreciated that as used herein, unless stated otherwise, transverse movement relative to the tile is intended to mean movement in a direction which is generally parallel to the first and second edges of the tile.

The body portion may have a third edge, and a fourth edge, the fourth edge being generally opposite the third edge, and the third and fourth edges may be provided with complementary shapes such that two adjacent tiles can cooperate so as to partially overlap.

For example, adjacent tiles within a single row of tiles may partially overlap so as to provide a weatherproof covering.

The body portion may be provided adjacent to the third edge with a first recessed portion on a first surface of the body portion and the body portion may be provided adjacent to the fourth edge with a second recessed portion on a second surface of the body portion, the second surface being opposite to the first surface.

The tile may be provided with one or more engagement features proximate the third edge and/or the fourth edge of the tile, said engagement features being arranged to limit relative transverse movement of two adjacent tiles.

It will be appreciated that as used herein transverse movement relative to the tile is intended to mean movement in a direction which is generally perpendicular to the third and fourth edges of the tile.

The may be formed from a plastics material. For example, the tiles may be formed using an injection moulding process. The plastics material may be a thermoplastic material, many of which have relatively high thermal expansion coefficients. Suitable materials include, for example, unplasticized polyvinyl chloride (uPVC), acrylonitrile styrene acrylate (ASA) and polypropelene (PP).

Alternatively, the tile may be formed from sheet metal. The sheet metal may comprise steel. For example, the sheet metal may be formed by a light gauge steel strip. The sheet metal may, for example, be folded or rolled to form a groove on a first edge of the tiles.

Alternatively, the tile may be formed from clay, concrete or the like.

According to a fourth aspect of the invention there is provided an elongate support for use in the tile system of the first aspect of the invention, the elongate support having an attachment portion and a support portion.

The support portion and the attachment portion may be generally parallel, spaced-apart and connected via a connection portion.

That is, in cross section the elongate support may be generally Z shaped. The connection portion may be generally perpendicular to the support and connection portions.

This shape allows two adjacent elongate supports to partially overlap such that the two elongate supports can move or slide relative to each other (along the direction of the two overlapping elongate supports) prior to fixing to a roof structure or wall. This is advantageous since it means that the elongate supports do not need to be cut precisely to length before installation. This is in contrast to prior art arrangements where timber battens need to be cut precisely to length before installation. It may be advantageous to have one or more standard lengths of elongate support which can be used for multiple situations.

The elongate may comprise a drip edge.

The elongate support may comprise one or more apertures along its length. Said apertures may be provided in a connection portion that extends between a support portion and an attachment portion. The apertures can allow ventilation to a void between the top of a roof structure and the tiles of the tile system.

The elongate support may be formed from sheet material. For example, the elongate supports are formed from sheet metal such as, for example, steel.

The support portion may comprise a first conductor, a second conductor and an insulating material disposed between the first and second conductors. It is known to provide one or more solar tiles in roof systems. Each such solar tile requires an electrical connection to be made and such electrical connections require additional expense and time to install. Providing at least one elongate support having a first conductor, a second conductor and an insulating material disposed between the first and second conductors, the elongate support could form a busbar to provide electrical connection between a plurality of solar tiles.

According to a fifth aspect of the invention there is provided a kit of parts comprising: at least two tiles, each tile being generally rectangular in shape and having a first edge, and a second edge, the second edge being generally opposite the first edge; and at least one elongate support, each elongate support having an attachment portion and a support portion; wherein proximate the first edge each tile is provided with a groove, the groove being configured to receive the support portion of one of the elongate supports and a portion of an adjacent tile proximate its second edge.

It will be appreciated that the kit of parts according to the fifth aspect of the invention may incorporate any of the features of the tile system of the first aspect of the invention.

Various aspects and features of the invention set out above or below may be combined with various other aspects and features of the invention as will be readily apparent to the skilled person.

Embodiments of the invention will now be described, by way of example only, with reference to the accompanying schematic drawings in which corresponding reference symbols indicate corresponding parts, and in which:

FIG. 9 is a side view of the counter support and portion of an elongate support engaged therewith shown in FIG. 8;

FIG. 19A is an end view of a second embodiment of an elongate support that may form part of a tile system according to an embodiment of the invention;

FIG. 19B is a perspective view of the elongate support shown in FIG. 19A;

FIG. 20 is a side view of a counter support which may form part of a tile system according to an embodiment of the invention and a portion of the elongate support shown in FIGS. 19A and 19B engaged therewith; and FIG. 21 is a side view of another counter support which may form part of a tile system according to an embodiment of the invention and a portion of the elongate support shown in FIGS. 19A and 19B engaged therewith.

Figure 1:
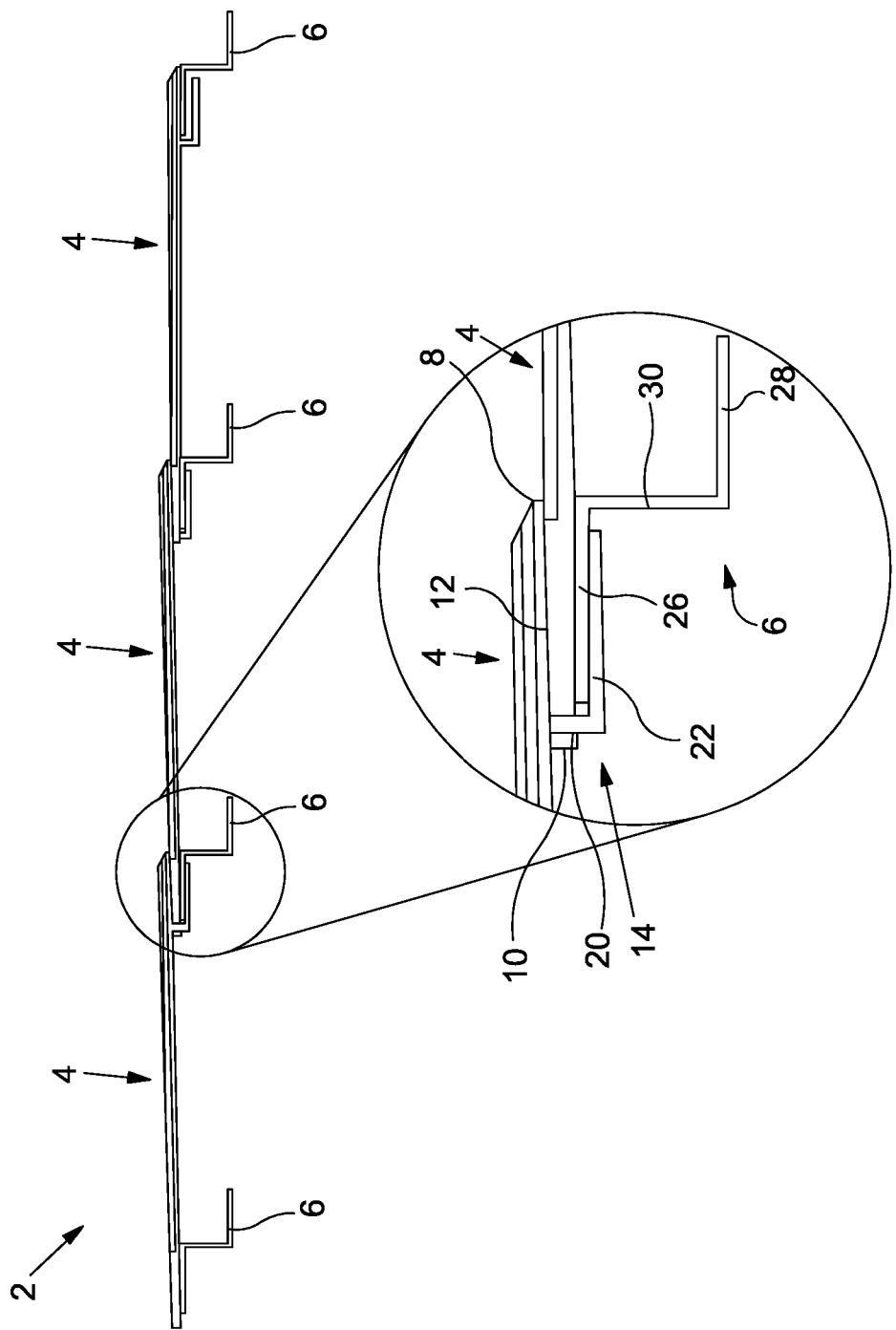
FIG. 1 is a side view of a first embodiment of a tile system according to the present invention.

FIG. 1 shows a side view of a first embodiment of a tile system 2 according to the present invention. The tile system 2 comprises a plurality of tiles 4 and a plurality of elongate supports 6.

Figure 2:
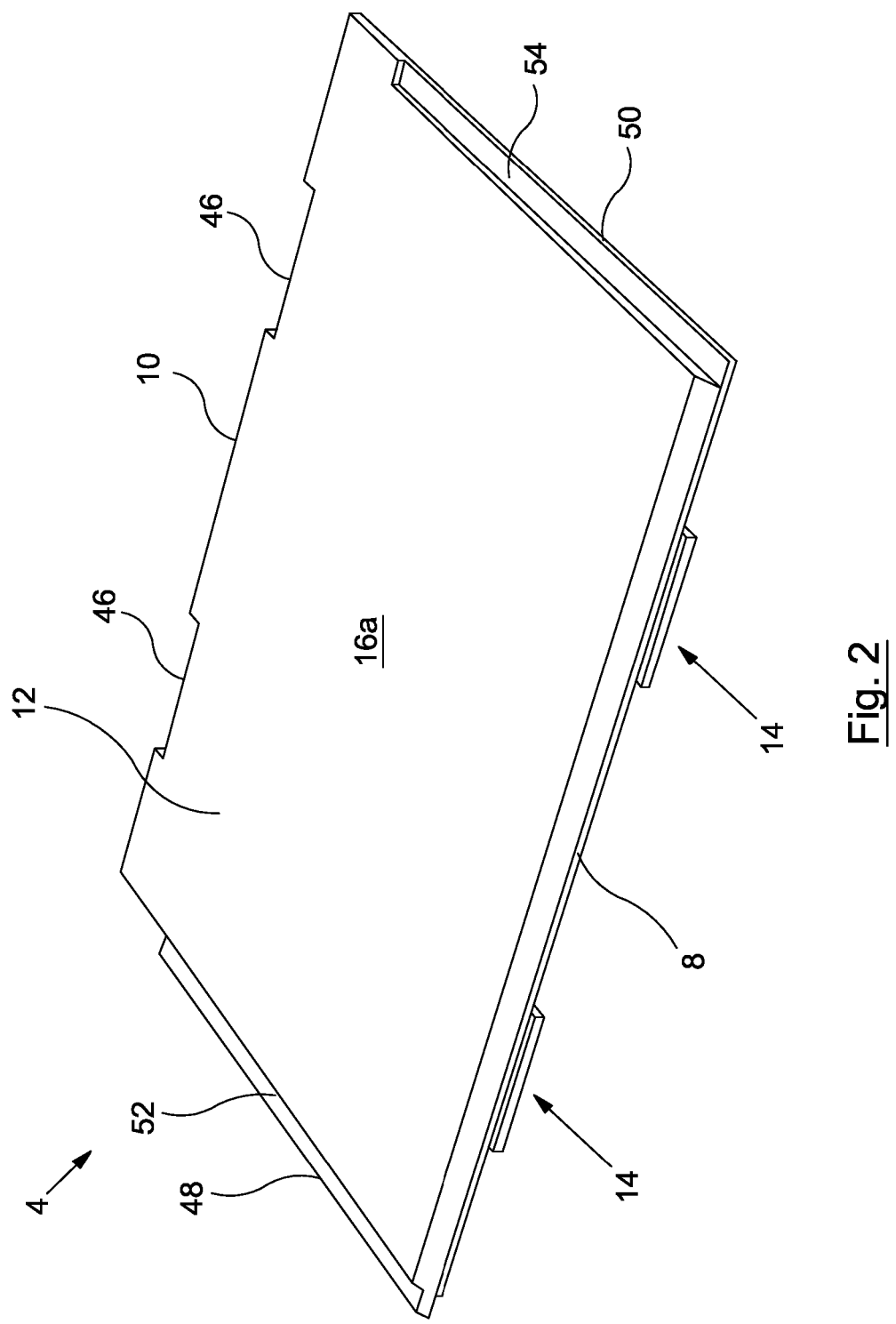
FIG. 2 is a first perspective view of a first tile according to an embodiment of the invention that forms part of the tile system shown in FIG. 1.
Figure 3:
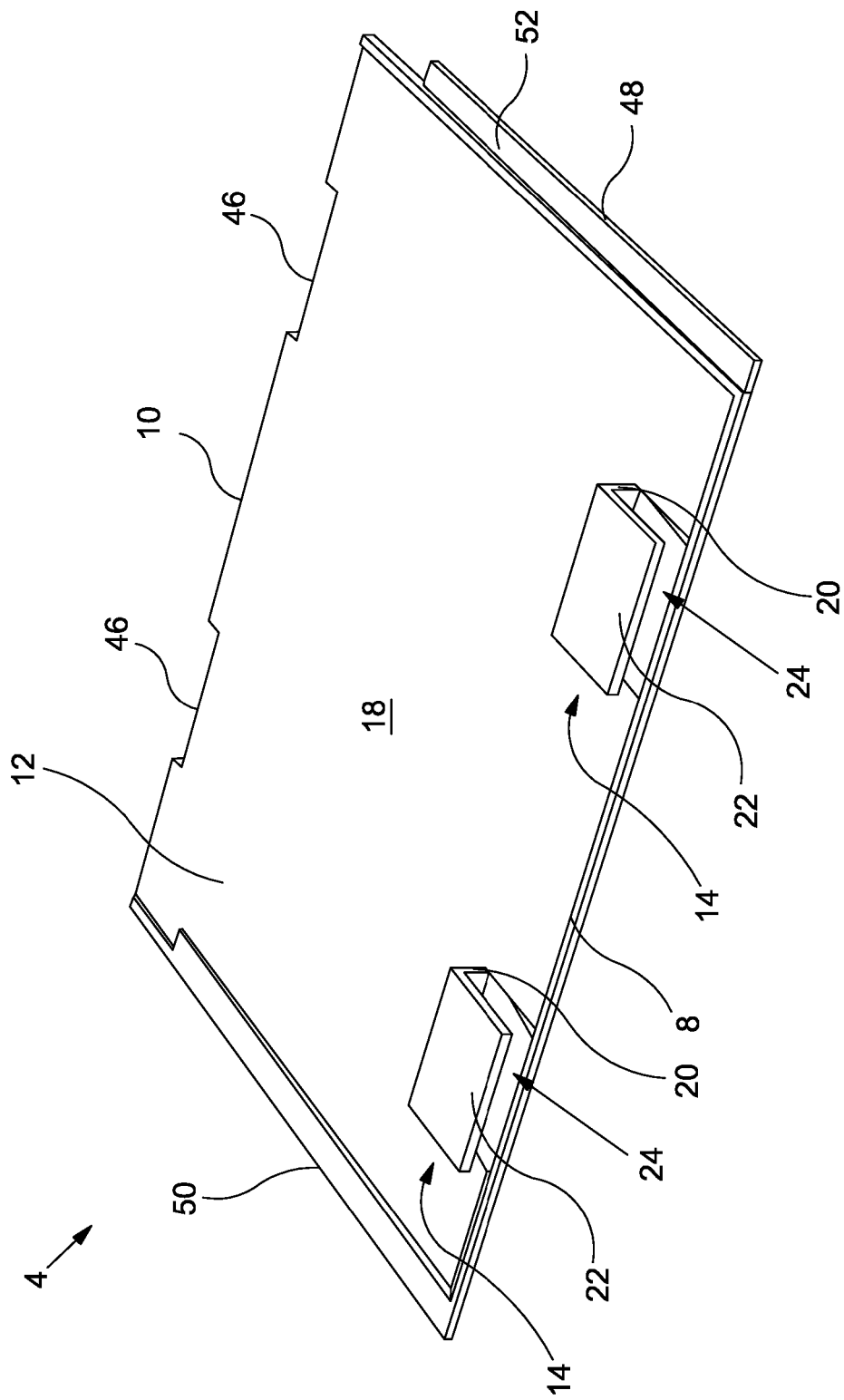
FIG. 3 is a second perspective view of the tile shown in FIG. 2.

FIGS. 2 and 3 each show a different perspective view of one of the plurality of tiles 4.

The tile 4 is generally rectangular in shape and having a first edge 8, and a second edge 10, the second edge 10 being generally opposite the first edge 8.

The tile 4 comprises a generally planar body portion 12 and two protrusions 14. The generally planar body portion 12 has two opposed surfaces: a first surface 16 and a second surface 18. The first surface 16 is shown in FIG. 2 and the second surface 18 is shown in FIG. 3. In use, the first surface 16 provides an outer or outward-facing surface of the tile system 2 and the second surface 18 provides an inner or inward-facing surface of the tile system 2.

Each of the protrusions 14 extends from the second surface 18 of the tile 4. Each of the protrusions 14 comprises a first portion 20 which extends generally away from the second surface 18 of the generally planar portion 12 and a second portion 22 which extends generally parallel to the planar portion 12 towards the first edge 8 of the tile 4.

The generally planar body portion 12 and the second portions 22 of the two protrusions 14 may be considered to define a groove 24 therebetween, the groove 24 being proximate the first edge 8 of the tile 4. Therefore the groove 24 on tile 4 may be considered to be formed by two discrete features that are spaced apart across the first edge 8.

The groove 24 is open in a direction that faces away from the body portion 12 and which is generally in a plane of the body portion 12. An internal dimension of the groove 24 is greater than an external dimension of a portion of the tile 4 proximate the second edge 10.

In one embodiment, the tile 4 is formed from a plastics material. For example, the tile 4 may be formed using an injection moulding process. The plastics material may be a thermoplastic material, many of which have relatively high thermal expansion coefficients. Suitable materials include, for example, unplasticized polyvinyl chloride (uPVC), acrylonitrile styrene acrylate (ASA) and polypropelene (PP).

In cross section (in a plane perpendicular to an axis of the elongate supports 6) the elongate supports 6 are generally Z-shaped. The elongate supports comprise: a support portion 26 and an attachment portion 28 that are generally mutually parallel, and spaced-apart, and a connection portion 30 extending between, and generally perpendicular to, the support portion 26 and the attachment portion 28.

The Z-shape of the elongate supports 6 allows two adjacent elongate supports 6 to partially overlap such that the two elongate supports 6 can move or slide relative to each other (along the direction of the two overlapping elongate supports 6) prior to fixing to a roof structure or wall. This is advantageous since it means that the elongate supports 6 do not need to be cut precisely to length before installation. This is in contrast to prior art arrangements where timber battens need to be cut precisely to length before installation. It may be advantageous to have one or more standard lengths of elongate support which can be used for multiple situations.

The elongate supports 6 may be formed from sheet material. For example, in one embodiment the elongate supports 6 are formed from sheet metal such as, for example, steel. For example, the sheet metal may be formed by a light gauge steel strip. The sheet metal may, for example, be folded or rolled to form the support portion 26, the attachment portion 28 and the connection portion 30.

As can be seen in FIG. 1, in use, the groove 24 proximate the first edge 8 of the tile 4 (which is defined by the generally planar body portion 12 and the second portions 22 of the protrusions 14) receives the support portion 26 of one of the elongate supports 6 and a portion of an adjacent tile 4 proximate its second edge 10.

Figure 4:
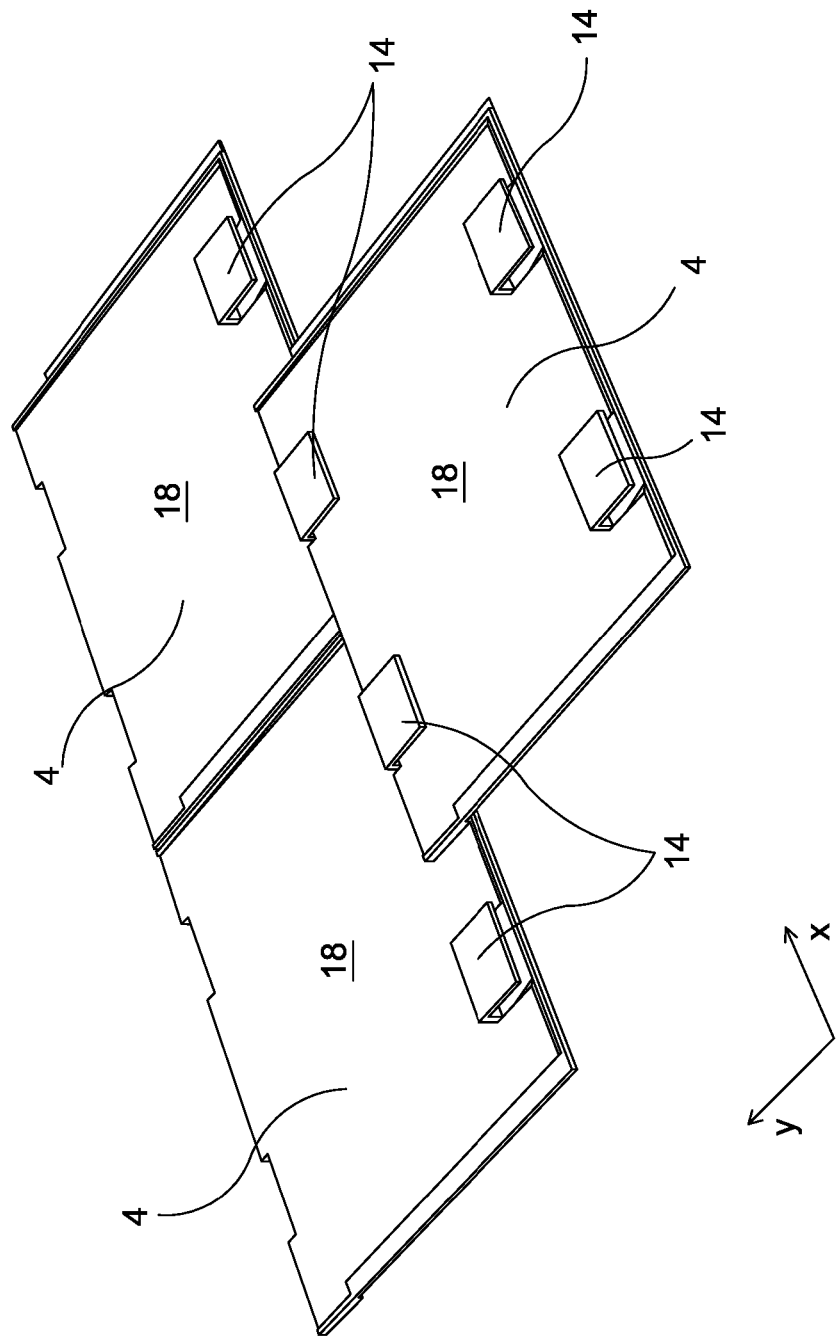
FIG. 4 shows a perspective view of a portion of the tile system shown in FIG. 1 showing only three tiles.

FIG. 4 shows a perspective view of a portion of the tile system 2 wherein only three tiles 4 are visible generally from their second sides 18. It will be appreciated that the tile system 2 can be used to cover a structure, as now discussed with reference to FIGS. 5 to 7.

The structure may be a roof structure, for example a pitched roof. Alternatively, the structure may be a wall (and for such embodiments the tiles 4 may be referred to as cladding).

Figure 5:
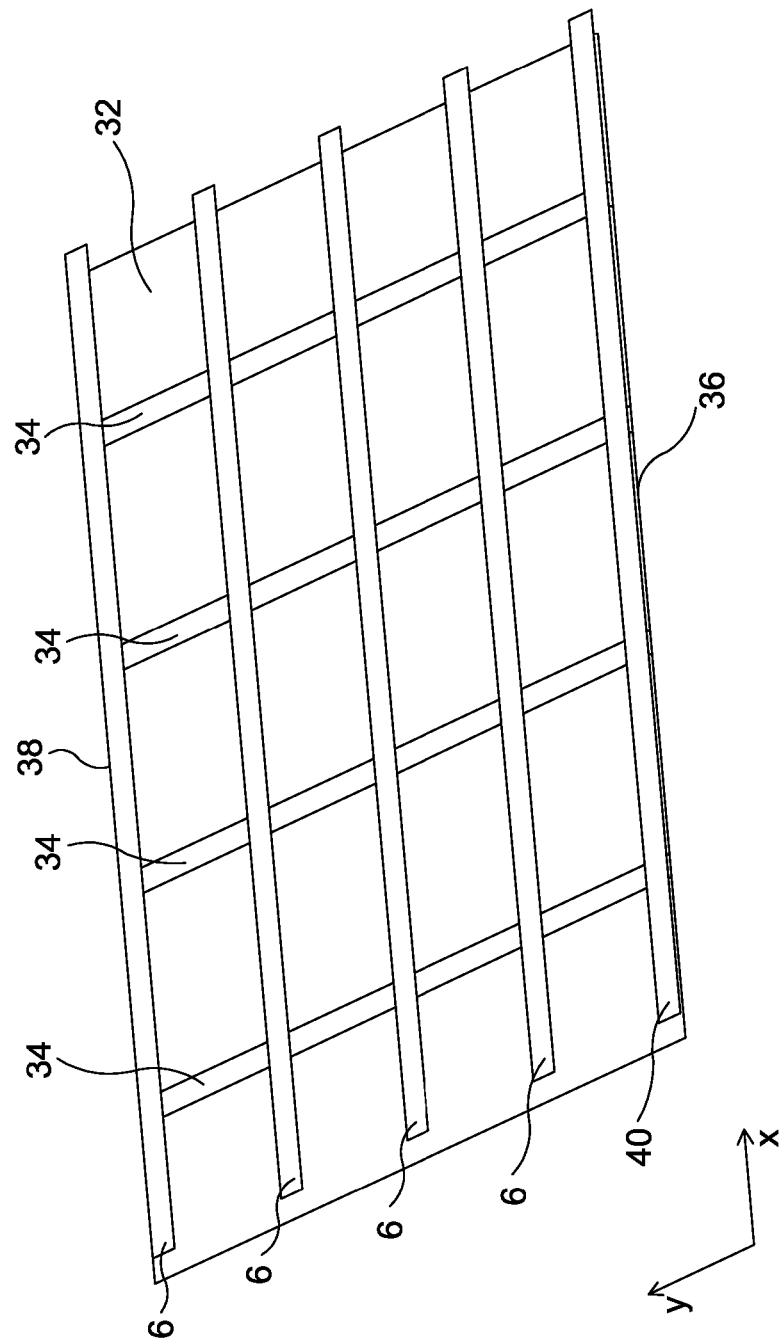
FIG. 5 shows a portion of the tile system shown in FIG. 1 used to cover a structure (for example a roof) with the tiles removed (for example before the tiles have been installed)

FIG. 5 shows a portion of the tile system 2 used to cover a structure 32 with the tiles removed (for example before the tiles 4 have been installed). The structure 32 may be a pitched roof.

A plurality of parallel spaced apart elongate supports 6 are attached to the structure 32. The elongate supports 6 extend generally horizontally the roof structure 32. In FIG. 5, the horizontal corresponds to the x-direction. In this embodiment, the elongate supports 6 are attached to the structure 32 via a plurality of counter supports 34. The counter supports 34 are attached to the roof structure 32, for example using mechanical fixings such as nails or screws or the like. The counter supports 34 are generally perpendicular to the horizontal. In FIG. 5, the counter supports 34 extend in the y-direction from a lower edge 36 of the structure 32 to an upper edge 38 of the structure 32. It will be appreciated that for a pitched roof, the y-direction is disposed at an oblique angle to the vertical direction whereas for a wall structure, the y-direction substantially corresponds to the vertical direction.

The tile system 2 is provided with a first support 40 proximate the lower edge 36 of the structure 32 for supporting a first row of tiles 4. As will be described further below, in some embodiments, first support 40 may differ in structure to the other elongate supports 6. However, it will be appreciated that, in some embodiments, first support 40 may be substantially the same in structure as the other elongate supports 6.

Next, the tiles 4 are installed. In use, the first edge 8 of each tile 4 forms a lower edge of the tile 4 and the second edge 10 of each tile 4 forms an upper edge of the tile 4.

Figure 6:
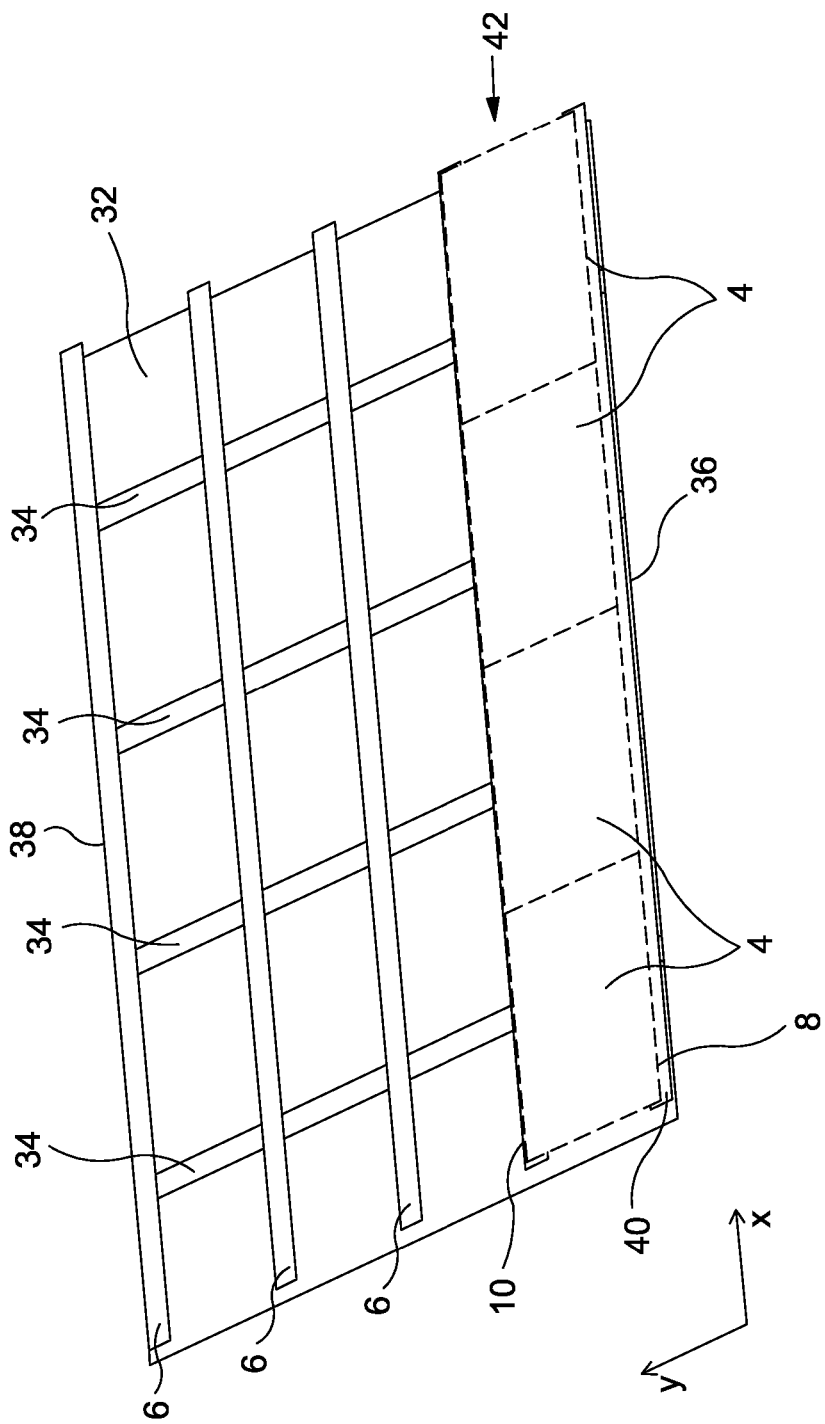
FIG. 6 shows the portion of the tile system as shown in FIG. 5 with the positions of a first row of tiles indicated by dotted lines.

A first row of tiles 4 is installed. FIG. 6 shows a portion of the tile system 2 used to cover the roof structure 32 as shown in FIG. 5 with the positions of the first row 42 of tiles 4 indicated (by dotted lines). Each tile 4 of the first row 42 of tiles 4 is installed such that a portion of the first support 40 is received in the groove 24 proximate the first edge 8 of the tile 4. In this way, the first edge 8 of the tiles 4 in the first row 42 is supported by the first support 40, the tiles 4 being held in place under gravity. The first row of tiles 4 is installed such that the portion of each tile 4 in the first row 42 of tiles 4 which is proximate to the second edge 10 is adjacent to the support portion 26 of one of the elongate supports 6. It will be appreciated that this is achieved by appropriate spacing of the first support 40 and the adjacent elongate support 6, given the dimension of the tiles 4 between the first and second edges 8, 10.

Figure 7:
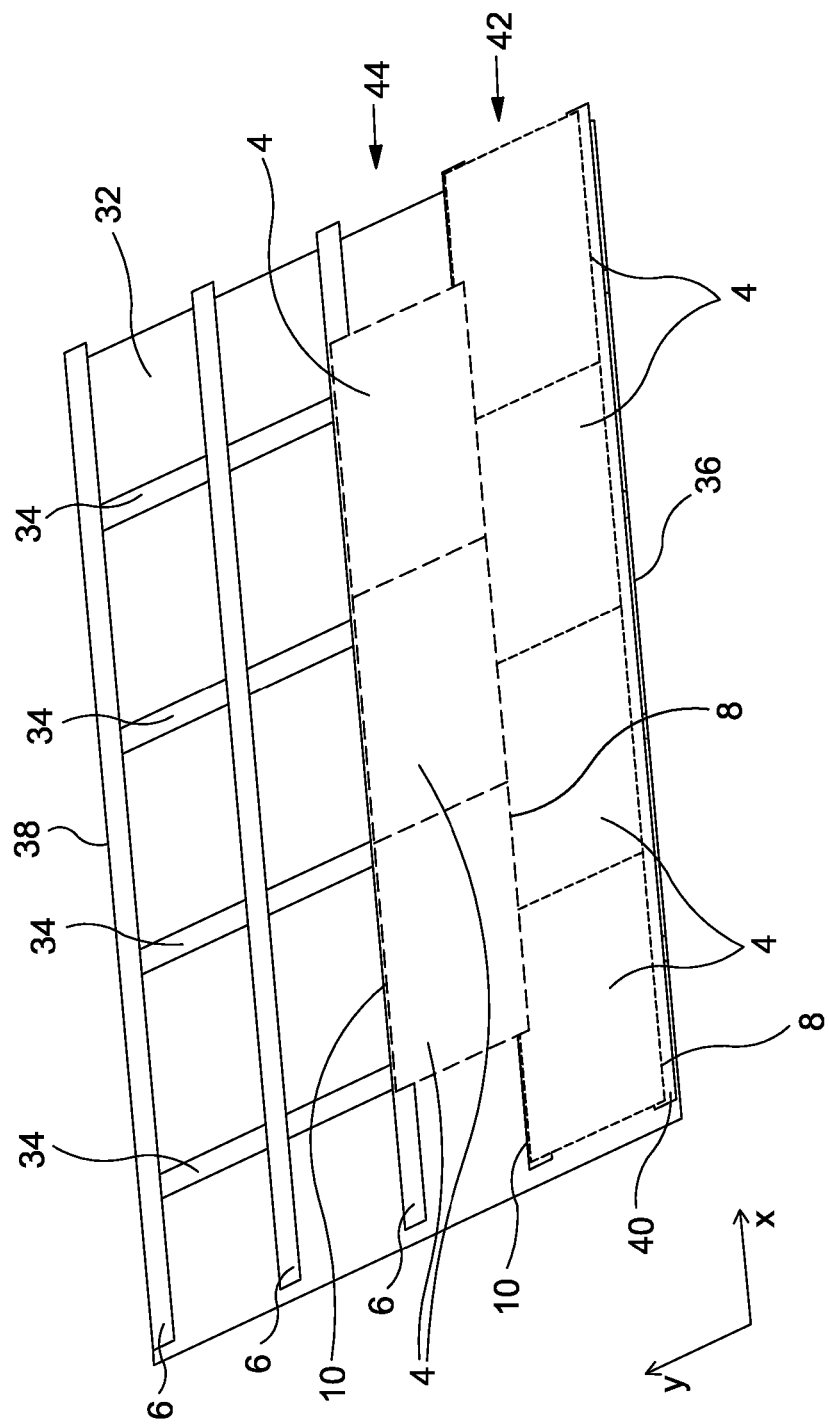
FIG. 7 shows the portion of the tile system as shown in FIG. 5 with the positions of a first row of tiles indicated by dotted lines and the positions of a second row of tiles indicated by dashed lines.

Next a second row 44 of tiles 4 is installed such that the second row 44 of tiles 4 partially overlaps the first row 42 of tiles 4. FIG. 7 shows a portion of the tile system 2 used to cover the roof structure 32 as shown in FIG. 5 with the positions of the first row 42 of tiles 4 indicated (by dotted lines) and the positions of a second row 44 of tiles 4 indicated (by dashed lines). The second row 44 of tiles 4 is installed by moving the first edge 8 of each of the second row 44 of tiles 4 towards both: the support portion 26 of the elongate support 6; and the portions of the first row 42 of tiles 4 proximate their second edges 10. As a result, both: the support portion 26 of the elongate support 6; and the portions of the first row 42 of tiles 4 proximate their second edges 10 are received in the groove 24 proximate the first edge 8 of the tiles 4 of the second row 44 of tiles.

In this way, the portion of each tile 4 in the first row 42 which is adjacent to the second edge 10 is constrained (by the groove 24) to be adjacent to the elongate support 6 but without any mechanical fixing thereto. In addition, the tiles 4 in the second row 44 of tiles 4 are supported by the support portion 26 of the elongate support 6, which is received in the groove 24, the tiles 4 in the second row 44 being held in place under gravity.

It will be appreciated that the tile system 2 can be extended to use any number of rows of tiles so as to cover a structure 32. It will be appreciated that a last row, or upper row, of tiles in the tile system 2 may be mechanically fixed (for example using screws or nails) to an upper elongate support 6.

The system 2 therefore uses significantly fewer fixings than a traditional tile system, with potentially only the last or upper row of tiles being mechanically fixed to the roof structure 32. This increases the ease of installation of the tile system 2 and the rate at which an installer can install the tile system 2 on the structure 32.

The tile system 2 is particularly advantageous for systems wherein the tiles 4 are formed from a material that is susceptible to significant thermal expansion and contraction and material softening in use. For example, tiles 4 formed from polymers are particularly susceptible to significant thermal expansion in use. This can be problematic if the tiles are rigidly fixed to support battens, as in prior art systems, since it can lead to buckling of the tile system and can cause the roof system to fail, such that it is no longer weatherproof unless care is taken to accommodate the thermal expansion and contraction. To counter any permanent distortion that may occur as a result of expansion, restraint and material softening polymer materials should be allowed to freely move whilst being secured against wind damage. To address this, current solutions require fixings to be applied in a way to allow this movement and therefore are subject to variation in quality and therefore performance. For such prior art systems, wherein each tile is mechanically fixed to a batten this typically increases the skill level that is required for an installer to correctly install the roof system. In contrast, the above-described tile system 2 allows free movement of the individual tiles 4 without requiring any special measures or skill.

The attachment portion 28 of the elongate support 6 may comprise an attachment surface for contacting a support system (for example via counter supports 34).

Referring again to FIGS. 2 and 3, the tiles 4 are provided with two rectangular recesses 46 on the second edge 10. The internal dimension of each recess 46 in a direction parallel to the second edge 10 substantially matches an external dimension of each of the protrusions 14 in this direction. Each recess 46 is generally aligned with one of the protrusions 14 in this direction. As can be seen from FIG. 4, in use, each protrusion 14 engages with a recess 46 in a second edge of a tile 4 from an adjacent (and lower) row of tiles within the tile system 2. In particular, in use, the first portion 20 of each protrusion 14 is received within a recess 46 in a second edge of a tile 4 from an adjacent (and lower) row of tiles within the tile system 2.

As can be seen from FIGS. 4 and 7, the tiles 4 within one row of tiles within the tile system 2 are offset in a transverse direction (i.e. a direction which is generally parallel to the first and second edges 8, 10) relative to the tiles 4 of an adjacent row of tiles within the tile system 2. In particular, the tiles within adjacent row of tiles within the tile system 2 are offset in the transverse direction by approximately half the length of the tiles 4 in this transverse direction. As a result, as can be seen from FIG. 4, in use, the two protrusions 14 from a given tile 4 engage with recesses 46 in two different tiles 4 from the adjacent (and lower) row of tiles 4 within the tile system 2.

The protrusions 14 provided proximate the first edge 8 of the tile 4 and the recesses 46 provided on the second edge 10 of the tile 4 may be considered to provide engagement features arranged to limit relative transverse movement of two adjacent tiles 4 when a portion of one of the two adjacent tiles 4 proximate its second edge 10 is received within the groove 24 of the other one of the two adjacent tiles 4. It will be appreciated that as used herein, unless stated otherwise, transverse movement within the tile system 2 is intended to mean movement in a direction which is generally parallel to the first and second edges 8, 10 of the tiles 4 and generally parallel to the elongate supports 6.

Each tile has a third edge 48 and a fourth edge 50, the fourth edge 48 being generally opposite the third edge 50. The third and fourth edges 48, 50 are provided with complementary shapes such that two adjacent tiles 4 from the same row of tiles can cooperate so as to mutually partially overlap. In particular, on the third edge 48, the tile 4 is provided with a tongue portion 52 and on the fourth edge 50 the tile 4 is provided with a rebated portion 54 on the first side 16 thereof. It will be appreciated that, in use, the tongue portion 52 of each tile 4 is arranged to be received within the rebated portion 54 of an adjacent tile 4 from the same row of tiles. In this way, adjacent tiles 4 within a single row of tiles may partially overlap so as to provide a weatherproof covering.

As explained above with reference to FIGS. 5 to 7, in some embodiments, the tile system 2 may comprise counter supports 34. The counter supports 34 may be attached to the roof structure 32, for example using mechanical fixings such as nails or screws or the like, such that the counter supports 34 are generally perpendicular to the horizontal. The elongate supports 6 may be attached to the structure 32 via a plurality of such counter supports 34. The counter supports may comprise timber battens and the elongate supports may be attached thereto using mechanical fixings such as nails or screws or the like.

Alternatively, the counter supports 34 may be formed from sheet material. For example, in one embodiment the counter supports 34 are formed from sheet metal such as, for example, steel. For example, the sheet metal may be formed by a light gauge steel strip. The sheet metal may, for example, be folded or rolled to form counter support 34, which may be generally of the form of generally hollow box beam. Advantageously, counter supports 34 formed from sheet metal may be provided with one or more features for engagement with the attachment portions 28 of the elongate supports 6.

FIGS. 8 to 10B show examples of counter supports, which may form the counter supports 34 shown in FIGS. 5 to 7.

Figure 8:
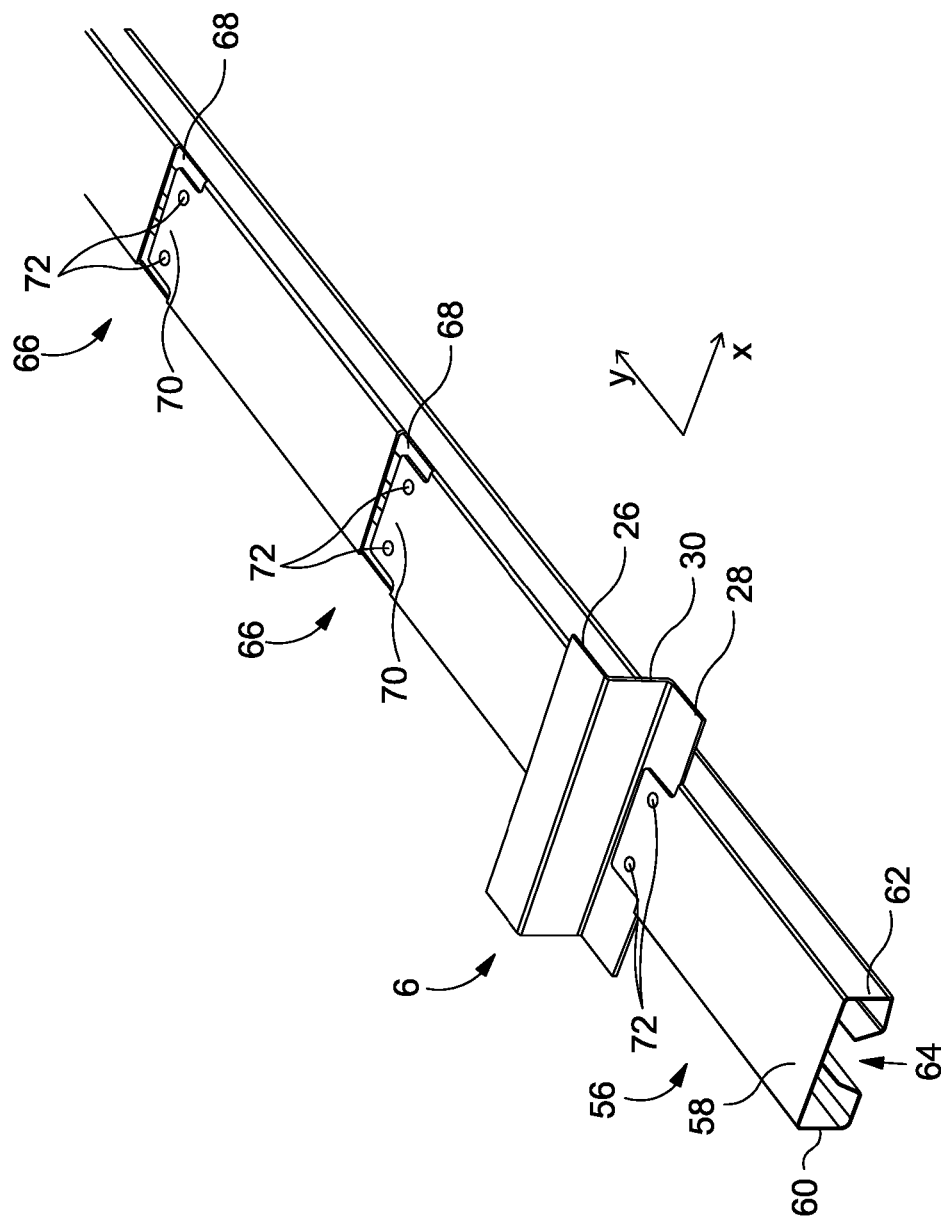
FIG. 8 is a perspective view of a first counter support (which may form part of the tile system as shown in FIGS. 1 to 7) and a portion of an elongate support engaged therewith.

FIGS. 8 and 9 show a counter support 56 (which may form any of the counter supports 34 shown in FIGS. 5 to 7) and a portion of an elongate support 6 engaged therewith.

The counter support 56 is generally of the form of a box beam having a channel or groove 64. The counter support 56 comprises a central wall portion 58 and two generally U-shaped side portions 60, 62. The channel or groove 64 is formed between the two side portions 60, 62. The channel 64 may be arranged to receive a ridge (for example a beam or rafter) provided on a structure 32. In other embodiments, the counter support 56 may be not provided with such a channel 64.

The counter support 56 is provided with a plurality of engagement features 66 for engagement with the attachment portions 28 of the elongate supports 6. The features are spaced apart along the counter support 56 (i.e. in the y-direction in FIG. 8), for example at regular intervals. Each engagement feature 66 comprises a generally U-shaped aperture 68 in the sheet metal. A central portion of the generally U-shaped aperture 68 extends across the central wall portion 58 of the counter support 56. Two side portions of the generally U-shaped aperture 68 extend generally perpendicularly to the central portion of the generally U-shaped aperture 68 and extend partially across the central wall portion 58 of the counter support 56 and partially across one of the two side portions 60, 62 of the counter support 56. The generally U-shaped aperture 68 extends around and defines a tab portion 70.

A portion of an elongate support 6 is shown in FIG. 8 engaged with one of the engagement features 66. As can be seen from FIG. 8, the attachment portion 28 of the elongate support 6 is received in the generally U-shaped aperture 68 and is held captive between the tab portion 70 and the two side portions 60, 62. Two fixing apertures 72 are provided in the tab portion to facilitate a mechanical fixing (for example a screw or the like) between the tab portion 70 and the attachment portion 28 of the elongate support 6.

It will be appreciated that a cross sectional profile of the counter supports 34 may differ from the counter support 56 shown in FIGS. 8 and 8 whilst still having engagement features 66 generally of the form described above. In particular, in some embodiments, the size and shape of the channel 64 may differ in dependence on a ridge (for example a beam or rafter) provided on a structure 32 with which it is intended to engage. Two modified embodiments of counter supports that have engagement features 66 generally of the form described above are now described with reference to FIGS. 10A and 10B.

Figure 10A:
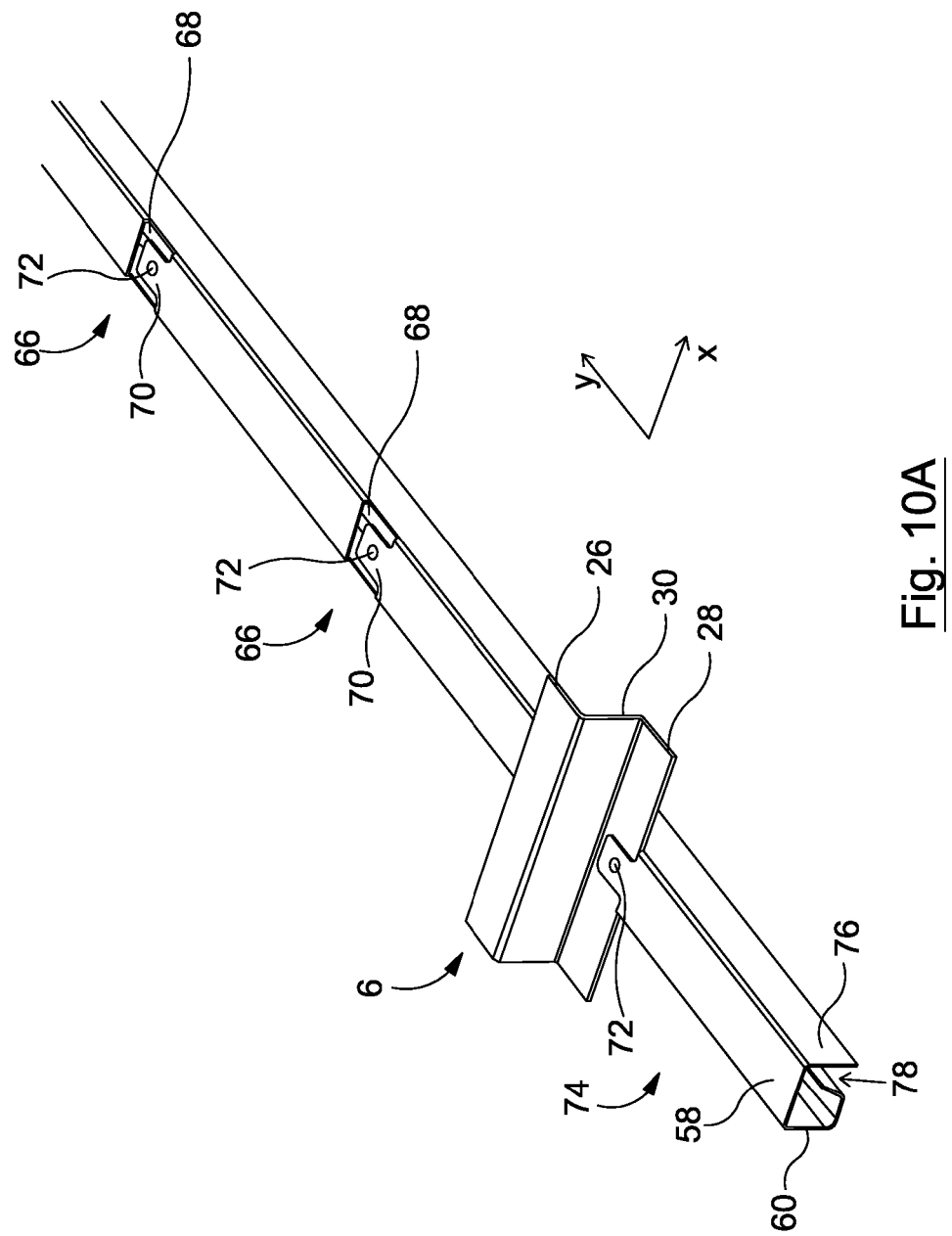
FIG. 10A is a perspective view of a second counter support (which may form part of the tile system as shown in FIGS. 1 to 7) and a portion of an elongate support engaged therewith.

FIG. 10A shows another counter support 74 (which may form any of the counter supports 34 shown in FIGS. 5 to 7) and a portion of an elongate support 6 engaged therewith. The counter support 74 shown in FIG. 10A shares many features in common with the counter support 56 shown in FIGS. 8 and 9. Only the differences between counter support 74 shown in FIG. 10A and the counter support 56 shown in FIGS. 8 and 9 are described here. Features of the counter support 74 shown in FIG. 10A which generally correspond to features of the counter support 56 shown in FIGS. 8 and 9 share common reference numerals therewith.

The counter support 74 is generally of the form of a box beam having a channel or groove 78. The counter support 74 comprises a central wall portion 58, one generally U-shaped side portion 60 and one generally planar side portion 76. The channel or groove 78 is formed between the two side portions 60, 76. The channel 78 may be arranged to receive a ridge provided on a structure 32. In other embodiments, the counter support 74 may be not provided with such a groove 78.

The engagement features 66 of the counter support 74 shown in FIG. 10A are generally the same as those of the counter support 56 shown in FIGS. 8 and 9 although the tab portion 70 has different dimensions and is provided with only one fixing aperture 72.

Figure 10B:
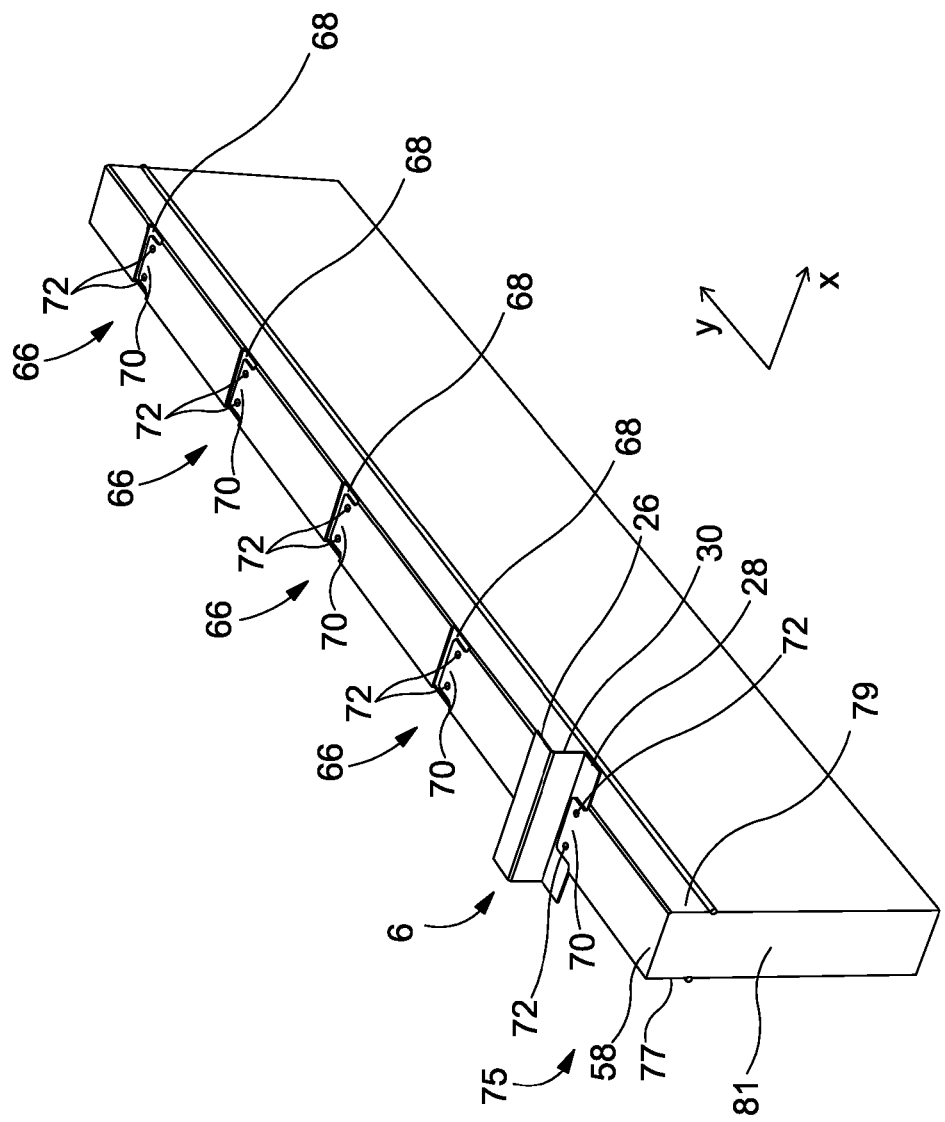
FIG. 10B is a perspective view of a third counter support (which may form part of the tile system as shown in FIGS. 1 to 7) and a portion of an elongate support engaged therewith, the third counter support being engaged with an end of a rafter.

FIG. 10B shows another counter support 75 (which may form any of the counter supports 34 shown in FIGS. 5 to 7) and a portion of an elongate support 6 engaged therewith. The counter support 75 shown in FIG. 10B shares many features in common with the counter support 56 shown in FIGS. 8 and 9. Only the differences between counter support 75 shown in FIG. 10B and the counter support 56 shown in FIGS. 8 and 9 are described here. Features of the counter support 75 shown in FIG. 10B which generally correspond to features of the counter support 56 shown in FIGS. 8 and 9 share common reference numerals therewith.

The counter support 75 is generally of the form of a box beam having a channel or groove. The counter support 75 comprises a central wall portion 58 and two generally planar side portions 77, 79. The channel or groove is formed between the two side portions 77, 79.

As shown in FIG. 10B, in use, the channel formed between the two side portions 77, 79 receives an end portion of a rafter 81. For example, the two side portions 77, 79 may be dimensioned so as to receive the end portion of the rafter 81 as a press-fit engagement. In addition, mechanical fixings (such as screws or the like) may be provided to secure the counter support 75 to the rafter 81. Said mechanical fixings may, for example, be provided through the central wall portion 58, for example through the fixing apertures 72 provided in the tab portions 70. One or more mechanical fixings may be provided through said fixing apertures 72 to secure an elongate support 6, the counter support 75 and the rafter 81 together.

The engagement features 66 of the counter support 75 shown in FIG. 10B are the same as those of the counter support 56 shown in FIGS. 8 and 9.

A second embodiment of a tile system 102 according to the present invention is now described with reference to FIGS. 11 to 15. The tile system 102 comprises a plurality of tiles 104 and a plurality of elongate supports 106.

The tile system 102, and parts thereof, as shown in FIGS. 11 to 15 shares many features in common with the tile system described above with reference to FIGS. 1 to 10B. Only the differences between tile system 102 as shown in FIGS. 11 to 15 and the tile system as shown in FIGS. 1 to 10B are described here in detail. Features of the tile system 102 as shown in FIGS. 11 to 15 shown in FIGS. 11 to 15 which generally correspond to features of the tile system 2 shown in FIGS. 1 to 10B are labelled with reference numerals that are given by the reference numerals of said corresponding features of the tile system 2 shown in FIGS. 1 to 10B plus 100.

Figure 11:
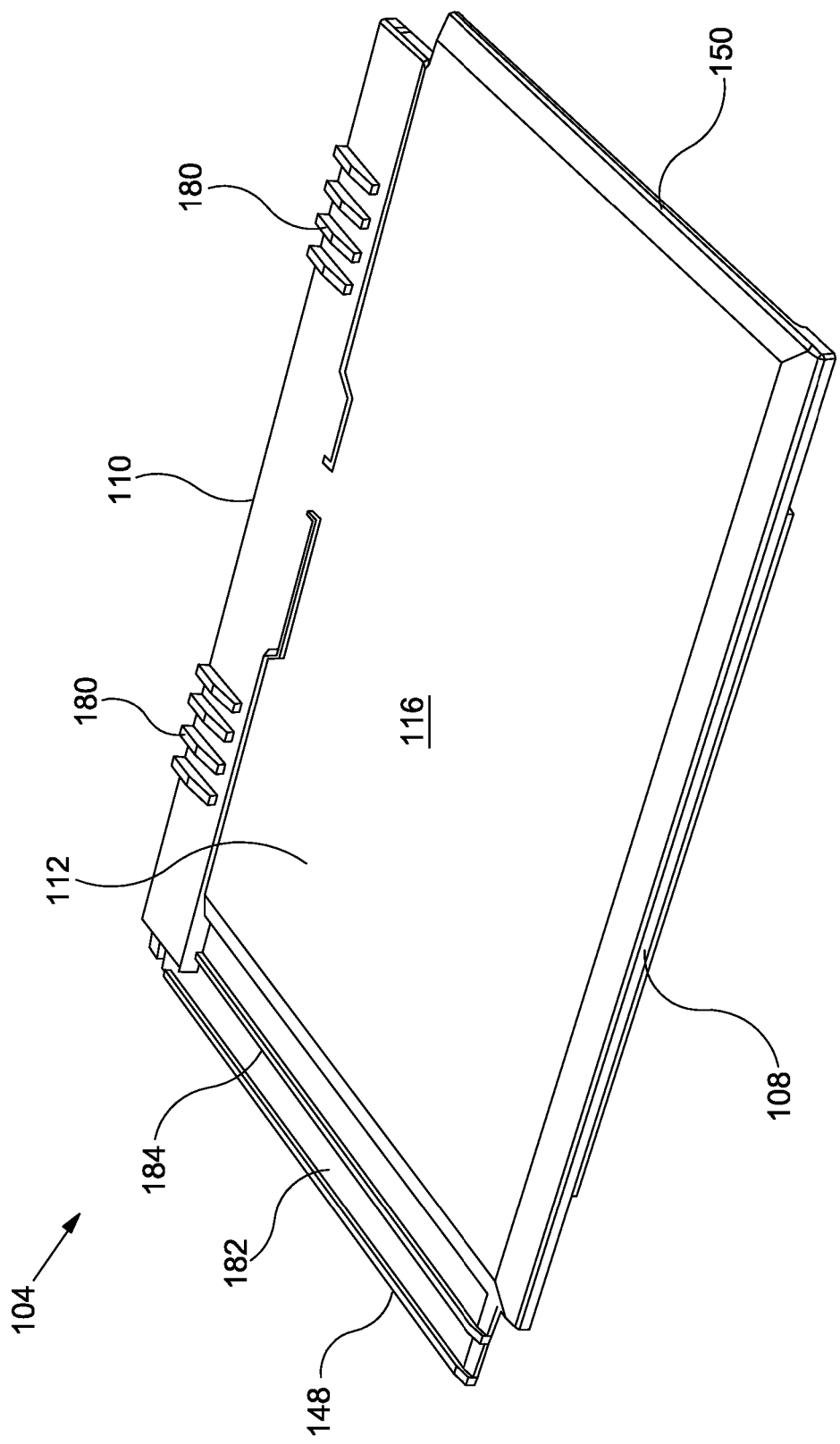
FIG. 11 is a first perspective view of one of a second tile according to an embodiment of the invention.
Figure 12:
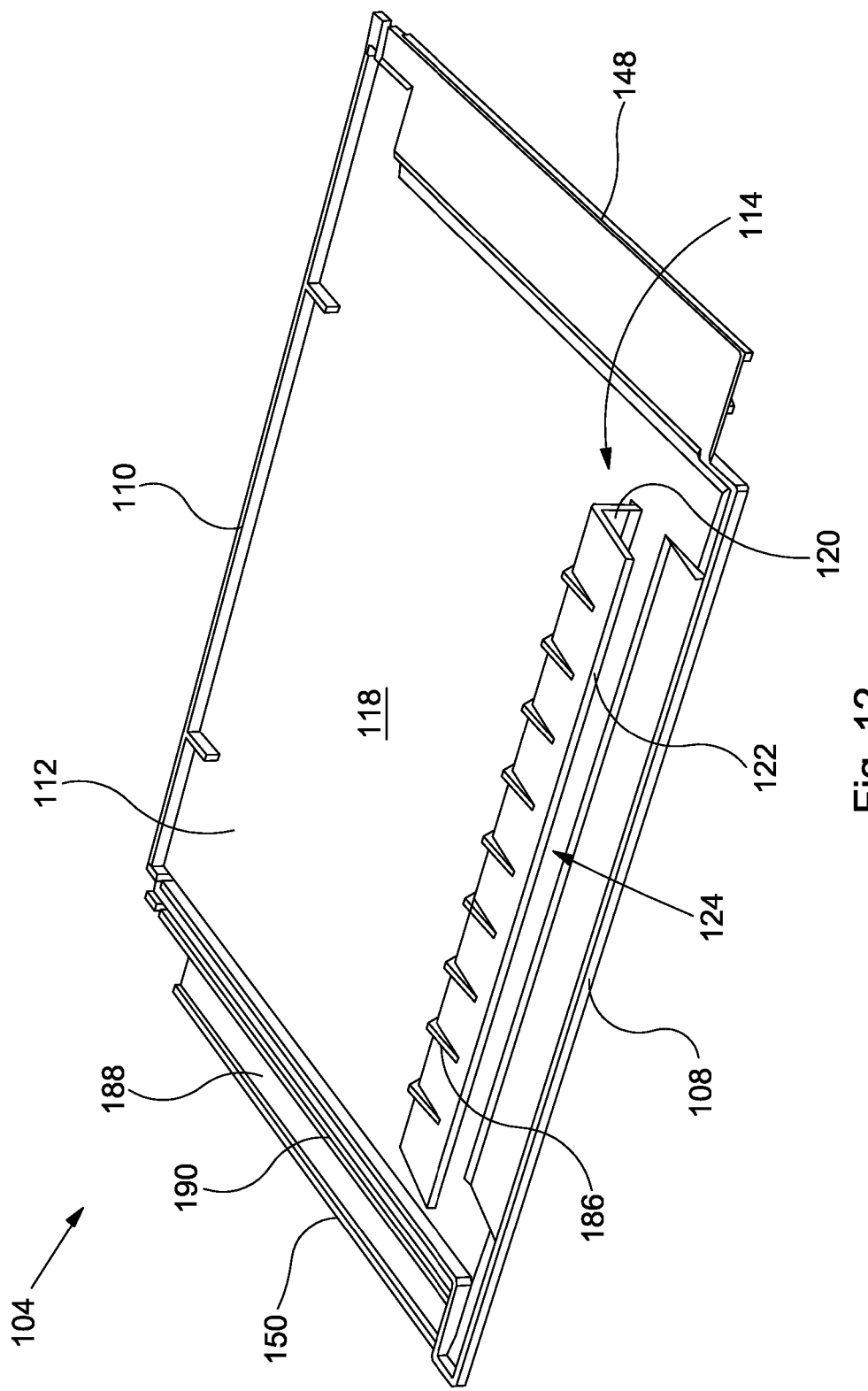
FIG. 12 is a second perspective view of the tile shown in FIG. 11.
Figure 13:
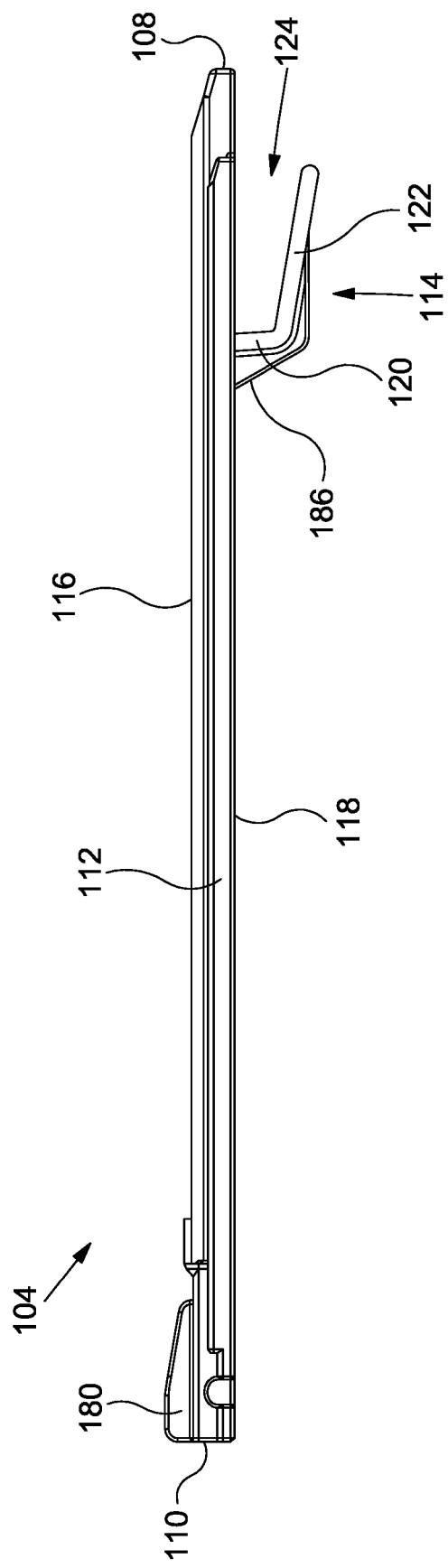
FIG. 13 is a side view of the tile shown in FIGS. 11 and 12.

FIGS. 11 to 13 show a tile 104 that shares many features in common with the tile 4 shown in FIGS. 2 and 3.

In particular, the tile 104 is generally rectangular in shape and having a first edge 108, and a second edge 110, the second edge 110 being generally opposite the first edge 108. The tile 104 comprises a generally planar body portion 112. The generally planar body portion 112 has two opposed surfaces: a first surface 116 and a second surface 118. The first surface 116 is shown in FIG. 11 and the second surface 118 is shown in FIG. 12. In use, the first surface 116 provides an outer or outward-facing surface of the tile system 102 and the second surface 118 provides an inner or inward-facing surface of the tile system 102.

In contrast to the tile 4 shown in FIGS. 2 and 3, the tile 104 shown in FIGS. 11 to 13 comprises a single protrusion 114.

The protrusion 114 extends from the second surface 118 of the tile 104. The protrusion 114 comprises a first portion 120 which extends generally away from the second surface 118 of the generally planar portion 112 and a second portion 122 which extends generally parallel to the planar portion 112 towards the first edge 108 of the tile 104.

The generally planar body portion 112 and the second portion 122 of the single protrusion 114 may be considered to define a groove 124 therebetween, the groove 124 being proximate the first edge 108 of the tile 104. Therefore the groove 124 on tile 104 may be considered to be formed across a substantial portion of the first edge 108. Although second portion 122 extends generally parallel to the planar portion 112, it can be seen that the second portion 122 is disposed at an oblique angle to the planar portion 112 such that the groove 124 tapers outwards moving towards the first edge 108 of the tile 104. The single protrusion 114 is provided with a plurality of strengthening webs 186 spaced along its length (in a direction parallel to the first edge 108).

The groove 124 is open in a direction that faces away from the body portion 112 and which is generally in a plane of the body portion 112. An internal dimension of the groove 124 is greater than an external dimension of a portion of the tile 104 proximate the second edge 110.

In one embodiment, the tile 104 is formed from a plastics material. For example, the tile 4 may be formed using an injection moulding process. The plastics material may be a thermoplastic material, many of which have relatively high thermal expansion coefficients. Suitable materials include, for example, unplasticized polyvinyl chloride (uPVC), acrylonitrile styrene acrylate (ASA) and polypropelene (PP).

The elongate support 106 (see FIG. 15) shares many features in common with the elongate support 6 shown in FIGS. 1 to 10B and described above.

In particular, in cross section (in a plane perpendicular to an axis of the elongate supports 106) the elongate supports 106 are generally Z-shaped. The elongate supports 106 comprise: a support portion 126 and an attachment portion 128 that are generally (though not exactly) mutually parallel, and spaced-apart, and a connection portion 130 extending between, and generally perpendicular to, the support portion 126 and the attachment portion 128.

The elongate supports 106 may be formed from sheet material. For example, in one embodiment the elongate supports 106 are formed from sheet metal such as, for example, steel. For example, the sheet metal may be formed by a light gauge steel strip. The sheet metal may, for example, be folded or rolled to form the support portion 126, the attachment portion 128 and the connection portion 130.

In addition to the support portion 126, the attachment portion 128 and the connection portion 130, the elongate supports 106 are provided with an end flange 109 at a distal end of the support portion 126.

Figure 15:
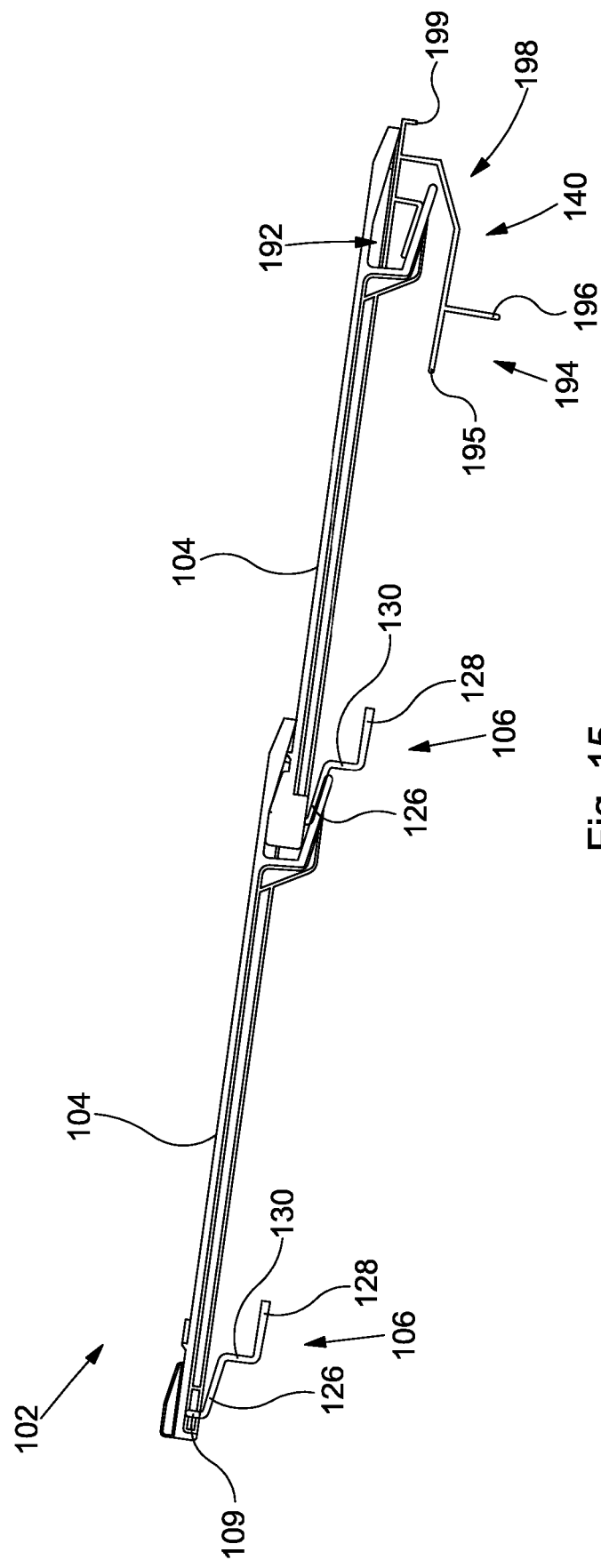
FIG. 15 is a side view of a portion of a tile system shown in FIG. 14 without the structure present.

As can be seen in FIG. 15, in use, the groove 124 proximate the first edge 108 of the tile 104 (which is defined by the generally planar body portion 112 and the second portions 122 of the protrusions 114) receives a support portion 126 of one of the elongate supports 106 and a portion of an adjacent tile 104 proximate its second edge 110.

Referring again to FIGS. 11 to 13, the tiles 104 are provided with two groups of ribs 180 in the first surface 116 proximate the second edge 110. These ribs extend in a direction that is generally perpendicular to the second edge 110. A portion of the second surface 118 of the planar body portion 112 that forms part of the groove 124 may be provided with corresponding ribs (not shown).

In use, each of the two groups of ribs 180 may engages corresponding ribs provided on the portion of the second surface 118 of the planar body portion 112 that forms part of the groove 124. The two groups of ribs 180 and the corresponding ribs provided on the portion of the second surface 118 of the planar body portion 112 that forms part of the groove 124 may be considered to provide engagement features arranged to limit relative transverse movement of two adjacent tiles 104 when a portion of one of the two adjacent tiles 104 proximate its second edge 110 is received within the groove 124 of the other one of the two adjacent tiles 104. It will be appreciated that as used herein, unless stated otherwise, transverse movement within the tile system 102 is intended to mean movement in a direction which is generally parallel to the first and second edges 108, 110 of the tiles 104 and generally parallel to the elongate supports 106.

Each tile 104 has a third edge 148 and a fourth edge 150, the fourth edge 148 being generally opposite the third edge 150. The third and fourth edges 148, 150 are provided with complementary shapes such that two adjacent tiles 104 from the same row of tiles can cooperate so as to mutually partially overlap. In particular, the tile 104 is provided with a first recessed portion 182 on the first surface 116 of the body portion adjacent to the third edge 148 and is provided with a second recessed portion 188 on the second surface 118 of the body portion 112 proximate to the fourth edge 150.

The tile 104 is provided with one or more longitudinal ribs 184 on the first recessed portion 182 extending generally parallel to the third edge 148. Similarly, tile 104 is provided with one or more longitudinal ribs 190 on the second recessed portion 188 extending generally parallel to the fourth edge 150. The longitudinal ribs 184 on the first recessed portion 182 and the one or more longitudinal ribs 190 on the second recessed portion 188 may be considered to provide with one or more engagement features (proximate the third edge 148 and the fourth edge 150 respectively), said engagement features being arranged to limit relative transverse movement of two adjacent tiles in the same row. Furthermore, the longitudinal ribs 184 on the first recessed portion 182 and the one or more longitudinal ribs 190 on the second recessed portion 188 may facilitate drainage of water or the like through the tile system 102.

Figure 14:
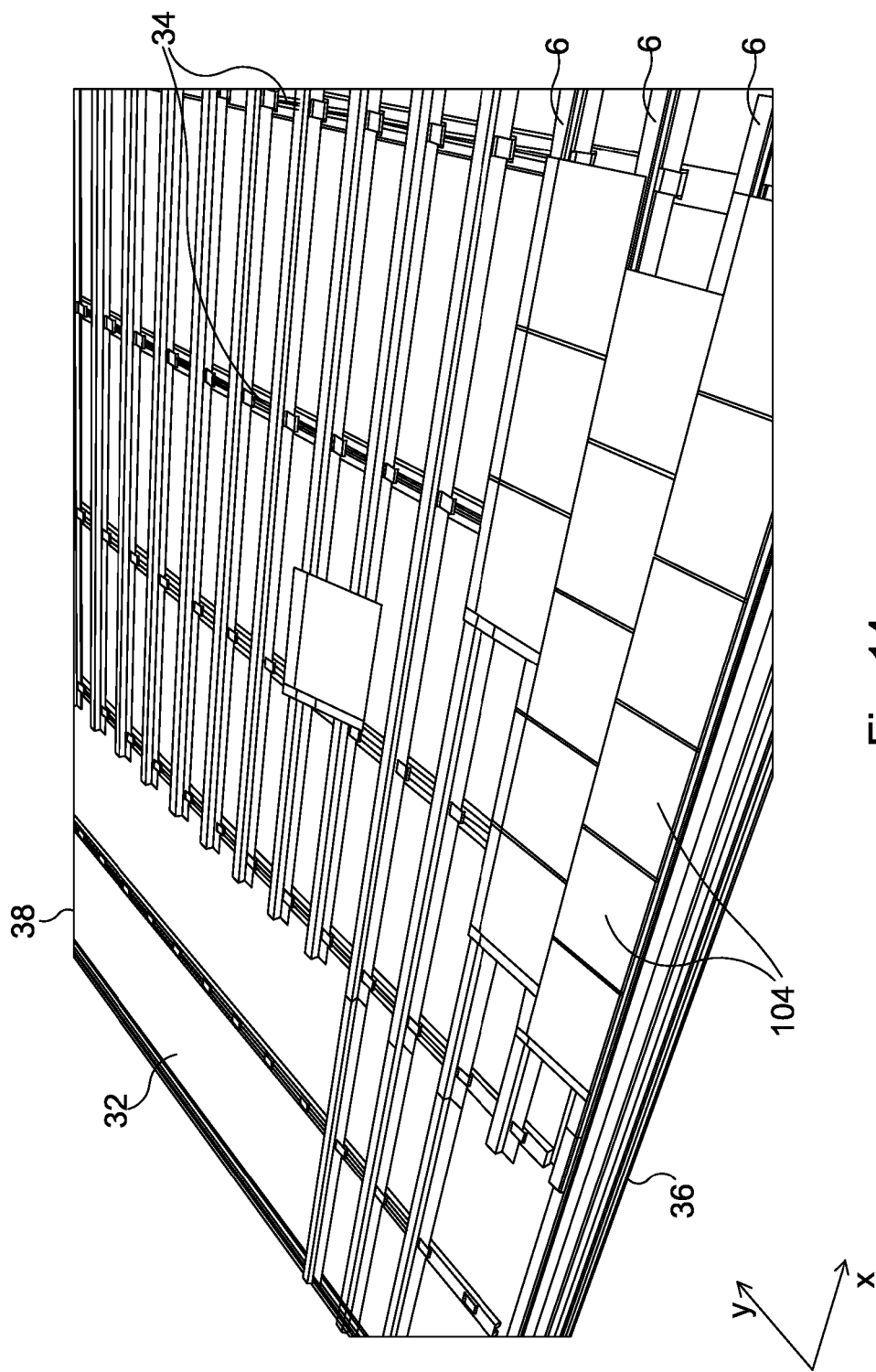
FIG. 14 shows a portion of a tile system according to a second embodiment of the present invention used to cover a structure (for example a roof) comprising tiles as shown in FIGS. 11 to 13.

As will be appreciated from FIG. 14, installation of the tile system 102 shown in FIGS. 11 to 15 is similar to installation of the tile system 2 shown in FIGS. 1 to 10B.

As shown in FIG. 15, the tile system 102 shown in FIGS. 11 to 15 comprises a first support 140. The first support 140 may be formed as an extruded metal section. The first support 140 comprises a support portion 192 which has an outer cross sectional profile that generally matches an inner cross sectional profile of the groove 124 formed on the tiles 104 and which is, in use, received within said groove 124.

The first support 140 further comprises an attachment portion 194 for attachment to a roof structure. In this embodiment, the attachment portion 194 comprises two generally mutually perpendicular portions 195, 196. A beam of a roof structure may be received in an angle between said two generally mutually perpendicular portions 195, 196 and attached thereto via mechanical fixings (such as screws or the like).

The first support 140 further comprises a connection portion 198 extending between the attachment portion 194 and the support portion 192. The first support 140 is generally U-shaped in cross section, the connection portion 198 forming a central portion of the U-shape and the attachment portion 194 and the support portion 192 forming two side portions of the U-shape.

In some embodiments, the connection portion 198 of the first support 140 comprises a drip edge 199.

In some embodiments, the connection portion 198 of the first support 140 may comprise one or more apertures (not shown) along its length. The apertures can allow ventilation to a void between the top of a roof structure and the tiles 104 of the tile system 102.

Figure 16:
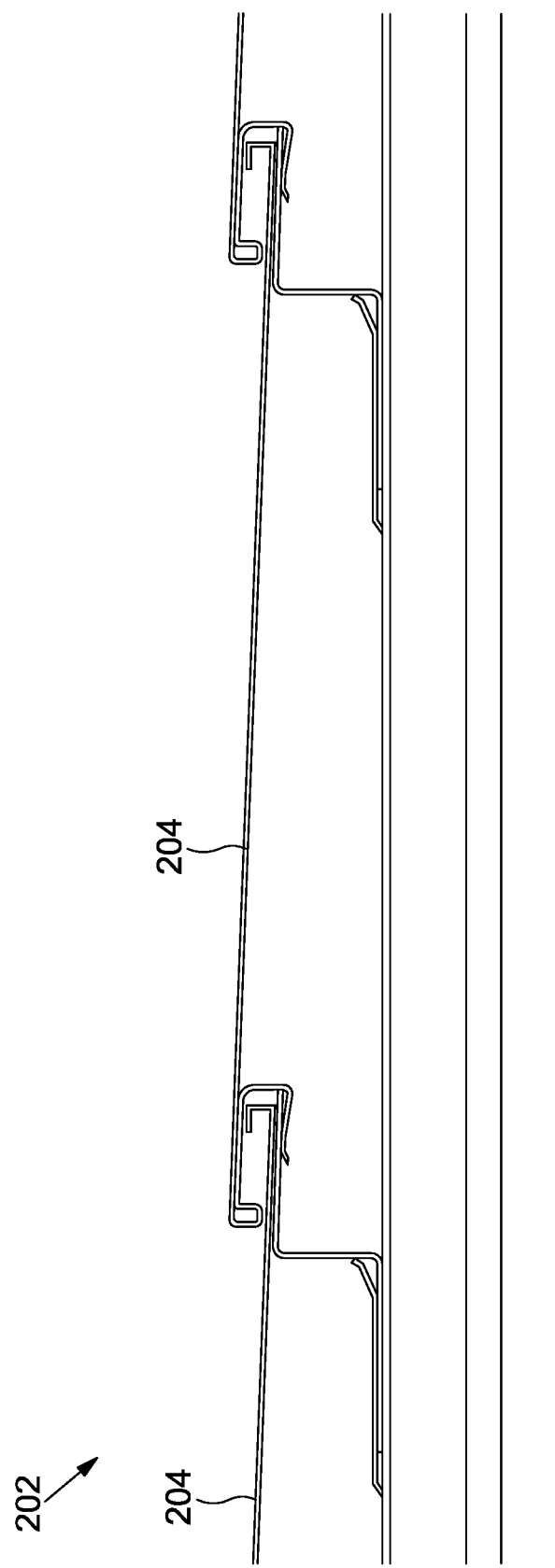
FIG. 16 is a side view of a third embodiment of a tile system according to the present invention.

FIG. 16 shows a third embodiment of a tile system 202 according to the present invention. The only difference between the tile system 202 shown in FIG. 16 and the tile system 2 shown in FIGS. 1 to 10B is the form of the tiles 204. In the embodiment shown in FIG. 16, the tiles 204 are formed from sheet metal such as, for example, steel. For example, the sheet metal may be formed by a light gauge steel strip. The sheet metal may, for example, be folded or rolled to form a groove on a first edge of the tiles 204.

A fourth embodiment of a tile system 302 according to the present invention is now described with reference to FIGS.

17 and 18. The tile system 302 comprises a plurality of tiles 304 and a plurality of elongate supports 6.

Figure 17:
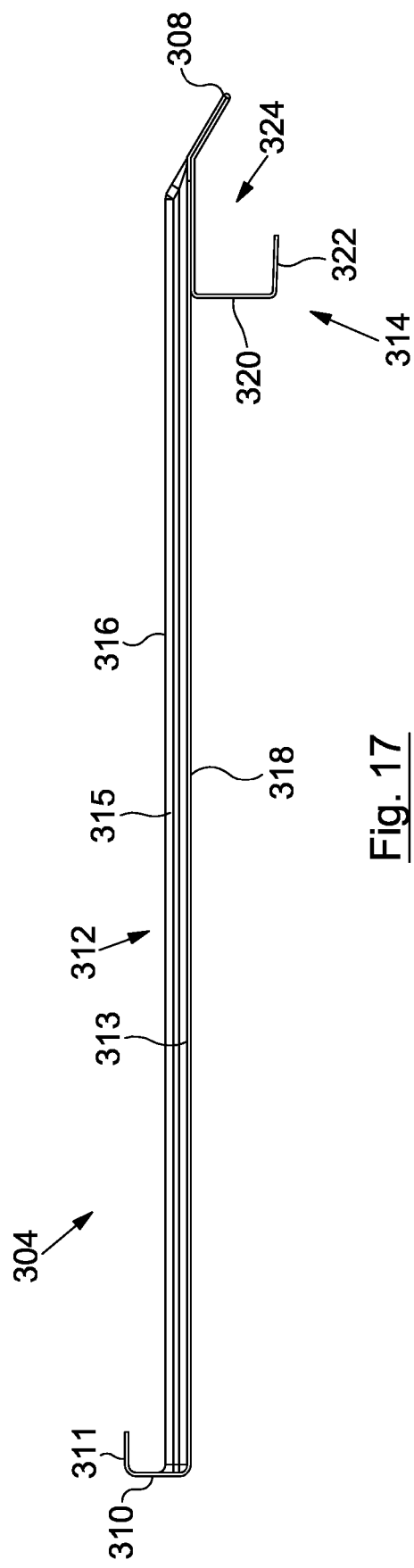
FIG. 17 is a side view of a fourth tile according to an embodiment of the invention.
Figure 18:
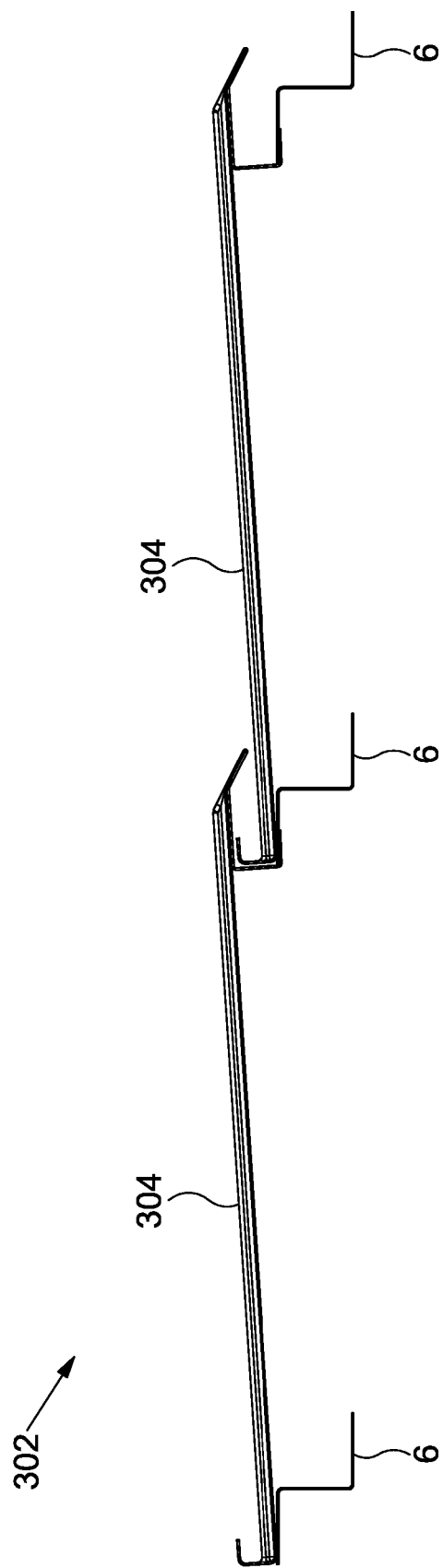
FIG. 18 is a side view of a fourth embodiment of a tile system according to the present invention which comprises tiles of the form shown in FIG. 17.

The tile system 302 as shown in FIGS. 17 and 18 shares many features in common with the tile system 2 described above with reference to FIGS. 1 to 10B. The only difference between tile system 302 as shown in FIGS. 17 and 18 and the tile system 2 as shown in FIGS. 1 to 10B is the form of the tiles 304. Features of the tile system 302 as shown in FIGS. 17 and 18 which generally correspond to features of the tile system 2 shown in FIGS. 1 to 10B are labelled with reference numerals that are given by the reference numerals of said corresponding features of the tile system 2 shown in FIGS. 1 to 10B plus 300.

FIG. 17 shows a tile 304 that shares many features in common with the tile 4 shown in FIGS. 2 and 3.

In particular, the tile 304 is generally rectangular in shape and having a first edge 308, and a second edge 310, the second edge 310 being generally opposite the first edge 308. The tile 304 comprises a generally planar body portion 312. The generally planar body portion 312 has two opposed surfaces: a first surface 316 and a second surface 318.

In contrast to the tile 304 shown in FIGS. 2 and 3, the tile 304 shown in FIG. 17 comprises a single protrusion 314.

The protrusion 314 extends from the second surface 318 of the tile 304. The protrusion 314 comprises a first portion 320 which extends generally away from the second surface 318 of the generally planar portion 312 and a second portion 322 which extends generally parallel to the planar portion 312 towards the first edge 308 of the tile 304.

The groove 324 is open in a direction that faces away from the body portion 312 and which is generally in a plane of the body portion 312.

The generally planar body portion 312 and the second portion 322 of the single protrusion 314 may be considered to define a groove 324 therebetween, the groove 324 being proximate the first edge 308 of the tile 304. Therefore the groove 324 on tile 304 may be considered to be formed across substantially the entire first edge 308.

In this embodiment, the tile 304 is formed from a first layer 313 and a second layer 315. In the embodiment shown in FIGS. 17 and 18, the first layer 313 is formed from sheet metal such as, for example, steel. For example, the sheet metal may be formed by a light gauge steel strip. The sheet metal may, for example, be folded or rolled to form the groove 324 on the first edge 308 of the tiles 304. The first layer 313 may be provided with an end flange portion 311 proximate the second edge 310. The second layer 315 may be formed from a different material and may be adhered to the first layer 313.

In the above described embodiments of tile systems 2, 102, 202, 302, the elongate supports are generally Z-shaped in cross section, which are all generally of the same form. For example, the elongate support 6 comprises: a generally planar support portion 26 and a generally planar attachment portion 28 that are generally mutually parallel and spaced-apart and a generally planar connection portion 30 extending between, and generally perpendicular to, the support portion 26 and the attachment portion 28. The planar support portion 28 is, in use, received in the groove 24 formed proximate the first edge of the tiles 4 (along with a portion of another tile proximate its second edge 10).

In some alternative embodiments, the elongate supports may have a different profile shape, which may be preferred, for example, if it is desired to provide an elongate support having greater strength. An alternative elongate support 406 is shown in FIGS. 19A and 19B.

The alternative elongate support 406 comprises: a generally planar support portion 426; two generally planar attachment portions 428a, 428b that are generally parallel to, and spaced-apart from, the generally planar support portion 426; and two generally planar connection portions 430a, 430b. Each of the generally planar connection portions 430a, 430b extends between, and generally perpendicular to, the support portion 426 and one of the attachment portions 428a, 428b.

As with the above-described elongate supports 6, embodiments employing the elongate support 406 shown in FIGS. 19A and 19B may be provided with counter battens that are provided with a plurality of engagement features for engagement with the attachment portions 428a, 428b of the elongate supports 406. These features may be spaced apart along the counter supports, for example at regular intervals. Two such counter battens 456a, 456b are shown in FIGS. 20 and 21 respectively. The counter battens 456a, 456b shown in FIGS. 20 and 21 may be generally of the form of any of the counter battens 56, 74, 75 shown in FIGS. 8 to 10B except for having modified engagement features so as to allow for engagement with the attachment portions 428a, 428b of the elongate supports 406.

In particular, as shown in FIGS. 20 and 21, the counter battens 456a, 456b each comprises: a first tab portion 470a for engagement with the a first attachment portion 428a of the elongate supports 406 and a second tab portion 470b for engagement with the a second attachment portion 428b of the elongate supports 406. These first and second tab portions 470a, 470b may be formed from portions of the counter batten that are bend so as to be protrude out of a plane of a surface of the counter batten (as shown in FIG. 20) to provide a groove for receipt of the first or second attachment portion 428a, 428b. Alternatively, these first and second tab portions 470a, 470b may be formed from portions of the counter batten that lie generally in a plane of a surface of the counter batten, an aperture being provided for receipt of the first or second attachment portion 428a, 428b in similar arrangement to the tab portion 70 of the counter batten 56 shown in FIGS. 8 and 9 (and as shown in FIG. 21).

In addition, a central support feature 471 may be provided for engagement with one of the two generally planar connection portions 430a, 430b.

In the above described embodiments the elongate supports 6, 106, 406 are described as being formed from a single sheet material (for example sheet steel). However, in some alternative embodiments of the present invention at least a support portion of the elongate supports may comprise a first conductor, a second conductor and an insulating material disposed between the first and second conductors. It is known to provide one or more solar tiles in roof systems. Each such solar tile requires an electrical connection to be made and such electrical connections require additional expense and time to install. Providing at least one elongate support having a first conductor, a second conductor and an insulating material disposed between the first and second conductors, the elongate support could form a busbar to provide electrical connection between a plurality of solar tiles. These embodiments are facilitated, at least in part, by the feature in tile systems 2, 102, 202, 302 according to embodiments of the present invention that the support portion of the elongate support is received in a groove proximate the first edge of the tiles. This may allow, for example, electrical connections to be made between such a tile and both opposed surfaces of the support portion of the elongate support. If these two opposed surfaces of the support portion of the elongate support are formed from conductors that are electrically insulated, the support portion of the elongate support can therefore act as a busbar. It will be appreciated by the skilled person that for such embodiments any connection between the elongate supports and a support system (for example counter supports) may be modified so as to prevent electrical connection being formed between the two conductors of the busbar. For example connection to metal counter supports 56, 74, 76 of the form shown in FIGS. 8 to 10B may be modified so as to use an insulating material to prevent conduction from the first to second conductor. This may be in the form of a separate insert (for example an injection moulding) or by way of the counter support being covered by an electrical insulating coating, for example a plastics coating. Furthermore, in such embodiments conductive mechanical fixings such as metal screws may not be used to fix through the support portion of the elongate support. Furthermore, in such embodiments coaxial elongate supports should not be overlapped, again to prevent electrical connection between the two conductors, and electrical connections should be provided between adjacent (non-overlapping coaxial elongate supports).

Although in the above described embodiments the tiles may be formed from a plastics material or a metal (for example, sheet steel), it will be appreciated that in alternative embodiments the tiles may be formed from any material. Other suitable materials may include, for example, clay or concrete.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A tile system comprising:
    at least two tiles, each tile included in the at least two tiles being generally rectangular in shape and having a first edge and a second edge, the second edge being generally opposite the first edge, each tile including a general planar portion having a first surface and a second surface opposite the first surface; and
    at least one elongate support, each elongate support included in the at least one elongate support having an attachment portion and a support portion;
    wherein proximate the first edge of each tile included in the at least two tiles is provided with a groove, the groove being configured to receive the support portion of one of the elongate supports included in the at least one elongate support and a portion of an adjacent tile included in the at least two tiles proximate its second edge, wherein the groove of each tile is formed from at least one protrusion having a first portion which extends generally away from the second surface of the generally planar portion and a second portion which extends generally parallel to the generally planar portion towards the first edge of the tile, and wherein the second surface of each tile is formed to define a recess that extends into the second surface toward the first surface and opens toward the second portion of the at least one protrusion; and
    wherein each tile is provided with one or more engagement features on a portion of the first surface of the tile proximate its second edge;
    wherein the one or more engagement features includes a rib on the first surface of each tile proximate the second edge, the rib extending away from the first surface and in a direction that is generally perpendicular to the second edge from a first end proximal the second edge to a second end distal the second edge, and wherein the rib is tapered such that an extent of the rib from the first surface at the first end is greater than an extent of the rib from the first surface at the second end; and
    wherein when the support portion of one of the elongate supports and a portion of a second one of the two adjacent tiles proximate its second edge are received within the groove of a first one of the two adjacent tiles and the rib of the second one of the two adjacent tiles is received in the recess formed in the second surface of the first one of the two adjacent tiles.

2. The tile system of claim 1, wherein the groove on each tile is formed by one or more discrete features that are spaced apart across the first edge.

3. The tile system of claim 1, wherein each tile has a third edge and a fourth edge, the fourth edge being generally opposite the third edge, and wherein the third and fourth edges are provided with complementary shapes such that two adjacent tiles can cooperate so as to partially overlap; and
    wherein a body portion of each tile is provided adjacent to the third edge of the respective tile with a first recessed portion on the first surface provided by the body portion and the body portion of each tile is provided adjacent to the fourth edge with a second recessed portion on the second surface provided by the body portion, the second surface being opposite to the first surface; and
    wherein each tile is provided with one or more engagement features proximate at least one of the third edge and the fourth edge of the tile, said engagement features being arranged to limit relative transverse movement of two adjacent tiles.

4. The tile system of claim 1, wherein each tile included in the at least two tiles is formed from one of plastics material and sheet metal.

5. The tile system of claim 1, wherein the support portion and the attachment portion of each elongate support are generally parallel, spaced-apart and connected via a connection portion.

6. The tile system of claim 1, further comprising a first support for supporting a first row of tiles; wherein the first support comprises a drip edge; and wherein the first support comprises one or more apertures along its length.

7. The tile system of claim 1, wherein each elongate support is formed from sheet material.

8. A tile for use in the tile system of claim 1.

9. A tile comprising:
    a body portion, the body portion being generally planar and rectangular in shape and having a first edge and a second edge, the second edge being generally opposite the first edge, the body portion further having a first surface and a second surface opposite the first surface;
    a groove proximate the first edge of the body portion, the groove being open in a direction that faces away from the body portion and which is generally in a plane of the body portion, wherein the groove of is formed from at least one protrusion having a first portion which extends generally away from the second surface and a second portion which extends generally parallel to the body portion towards the first edge, wherein the second surface of each tile is formed to define a recess that extends into the second surface toward the first surface and opens toward the second portion of the at least one protrusion; and one or more engagement features on the portion of the tile proximate its second edge, wherein the one or more engagement features includes a rib on the first surface of the tile proximate the second edge, the rib extending in a direction that is generally perpendicular to the second edge from a first end proximal the second edge to a second end distal the second edge, and wherein the rib is tapered such that an extent of the rib from the first surface at the first end is greater than an extent of the rib from the first surface at the second end;

wherein an internal dimension of the groove is greater than an external dimension of a portion of the tile proximate the second edge; and wherein a portion of the tiles proximate its second edge is configures to be received in the groove of a similar adjacent tile such that the rib of the tile is received in the recess formed in the second surface of the similar adjacent tile.

10. The tile of claim 9, wherein the groove is formed by one or more discrete features that are spaced apart across the first edge.

11. The tile of claim 9, wherein the body portion has a third edge and a fourth edge, the fourth edge being generally opposite the third edge, and wherein the third and fourth edges are provided with complementary shapes such that two adjacent tiles can cooperate so as to partially overlap; and wherein the body portion is provided adjacent to the third edge with a first recessed portion on the first surface of the body portion and the body portion is provided adjacent to the fourth edge with a second recessed portion on the second surface of the body portion, the second surface being opposite to the first surface; and wherein the tile is provided with one or more engagement features proximate at least one of the third edge and the fourth edge of the tile, said engagement features being arranged to limit relative transverse movement of two adjacent tiles.

12. The tile of claim 9, wherein the tile is formed from at least one of plastics material and sheet metal.

13. A kit of parts comprising:
at least two tiles, each tile being generally rectangular in shape and having a first edge and a second edge, the second edge being generally opposite the first edge each tile including a general planar portion having a first surface and a second surface opposite the first surface; and
at least one elongate support, each elongate support having an attachment portion and a support portion;
wherein proximate the first edge each tile is provided with a groove, the groove being configured to receive the support portion of one of the elongate supports and a portion of an adjacent tile proximate its second edge, wherein the groove of each tile is formed from at least one protrusion having a first portion which extends generally away from the second surface of the generally planar portion and a second portion which extends generally parallel to the generally planar portion towards the first edge of the tile, and wherein the second surface of each tile is formed to define a recess that extends into the second surface toward the first surface and opens toward the second portion of the at least one protrusion; and wherein each tile is provided with one or more engagement features on a portion of the first surface of the tile proximate its second edge;

wherein the one or more engagement features includes a rib on the first surface of each tile proximate the second edge, the rib extending away from the first surface and in a direction that is generally perpendicular to the second edge from a first end proximal the second edge to a second end distal the second edge, and wherein the rib is tapered such that an extent of the rib from the first surface at the first end is greater than an extent of the rib from the first surface at the second end; and wherein when the support portion of one of the elongate supports and a portion of a second one of the two adjacent tiles proximate its second edge are received within the groove of a first one of the two adjacent tiles and the rib of the second one of the two adjacent tiles is received in the recess formed in the second surface of the first one of the two adjacent tiles.

14. The tile system of claim 1, wherein the recess is defined by a surface that includes a first portion that is generally parallel with the first surface and a second portion that tapers at an angle away from the first portion.

15. The tile system of claim 14, wherein the groove on each tile is formed by one or more discrete features that are spaced apart across the first edge.

16. The tile system of claim 15, wherein the one or more engagement features includes a second rib spaced apart from the rib in a direction transverse to the second edge.

17. The tile system of claim 9, wherein the recess is defined by a surface having a first portion that is generally parallel with the first surface and a second portion that tapers at an angle away from the first portion.

18. The tile system of claim 17, wherein the groove is formed by one or more discrete features that are spaced apart across the first edge.

19. The tile system of claim 13, wherein the recess is defined by a surface having a first portion that is generally parallel with the first surface and a second portion that tapers at an angle away from the first portion and wherein the groove of each tile is formed by one or more discrete features that are spaced apart across the first edge.

* * * * *